(12) United States Patent
Shahana

(10) Patent No.: US 6,880,425 B2
(45) Date of Patent: Apr. 19, 2005

(54) SHIFT CONTROL DEVICE FOR A BICYCLE TRANSMISSION

(75) Inventor: Satoshi Shahana, Osaki (JP)

(73) Assignee: Shimano, Inc., Sakai (JP)

( * ) Notice: Subject to any disclaimer, the term of this patent is extended or adjusted under 35 U.S.C. 154(b) by 131 days.

(21) Appl. No.: 10/225,037

(22) Filed: Aug. 20, 2002

(65) Prior Publication Data

US 2004/0005946 A1 Jan. 8, 2004

Related U.S. Application Data

(63) Continuation-in-part of application No. 10/190,462, filed on Jul. 5, 2002.

(51) Int. Cl.[7] ................................................. F16C 1/10
(52) U.S. Cl. ..................................... 74/502.2; 74/501.6
(58) Field of Search ............................. 74/502.2, 501.6, 74/486, 487, 488, 489, 500.5, 577 M

(56) References Cited

U.S. PATENT DOCUMENTS

| 5,020,387 | A | | 6/1991 | Nagano |
| 5,358,451 | A | | 10/1994 | Lacombe et al. |
| 5,479,776 | A | | 1/1996 | Romano |
| 5,618,241 | A | | 4/1997 | Ose |
| 5,701,786 | A | * | 12/1997 | Kawakami ................ 74/502.2 |
| 5,775,168 | A | | 7/1998 | Furuta |
| 5,921,138 | A | | 7/1999 | Kojima et al. |
| 6,220,111 | B1 | * | 4/2001 | Chen ........................ 74/473.15 |
| 6,397,700 | B1 | * | 6/2002 | Liu et al. ................... 74/502.2 |

FOREIGN PATENT DOCUMENTS

| EP | 509457 A1 | 10/1992 |
| EP | 523257 A1 | 1/1993 |
| EP | 1134158 A2 | 9/2001 |

* cited by examiner

Primary Examiner—David A. Bucci
Assistant Examiner—Bradley J. Van Pelt
(74) Attorney, Agent, or Firm—James A. Deland

(57) ABSTRACT

A shift control device includes a mounting unit; a transmission control element movably mounted to the mounting unit, wherein the transmission control element moves between a first transmission control position and a second transmission control position; a first transmission control element biasing mechanism for biasing the transmission control element toward the first transmission control position; and a first shift control element that moves between a first shift control position and a second shift control position. The first shift control element and the transmission control element are operatively coupled such that the transmission control element moves toward the second transmission control position when the first shift control element moves toward the second shift control position, and the transmission control element moves toward the first transmission control position as the first shift control element continues to move toward the second shift control position.

73 Claims, 27 Drawing Sheets

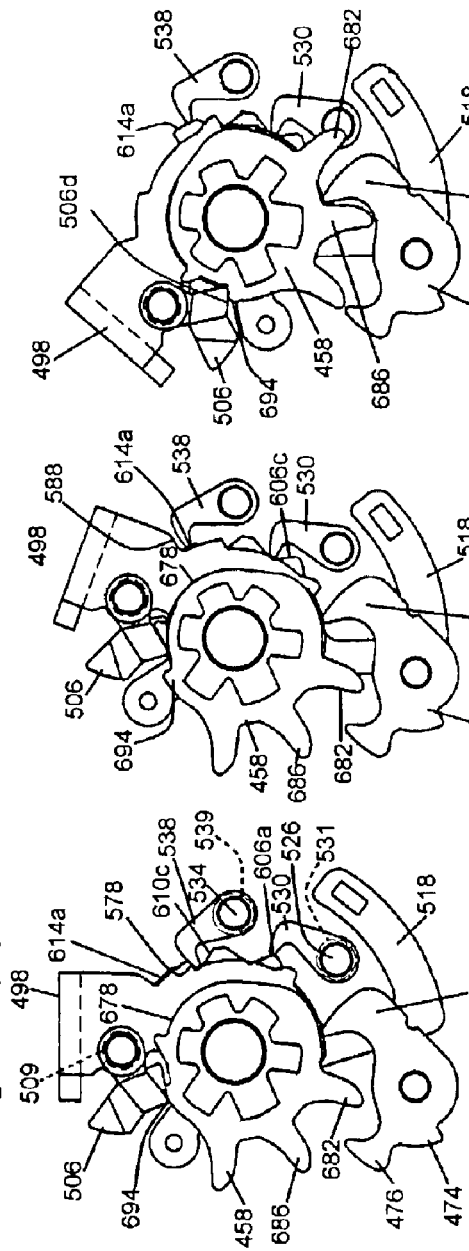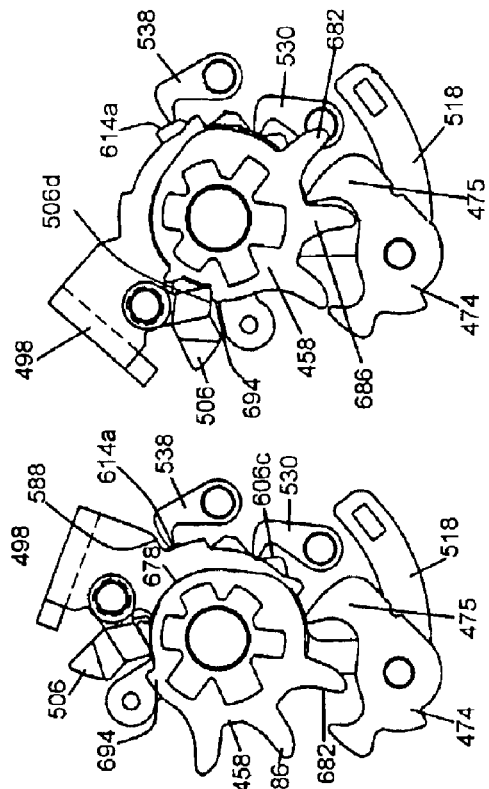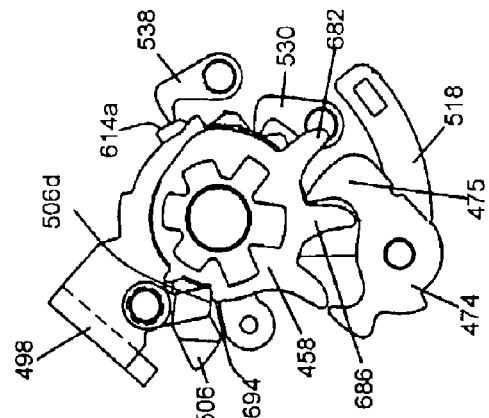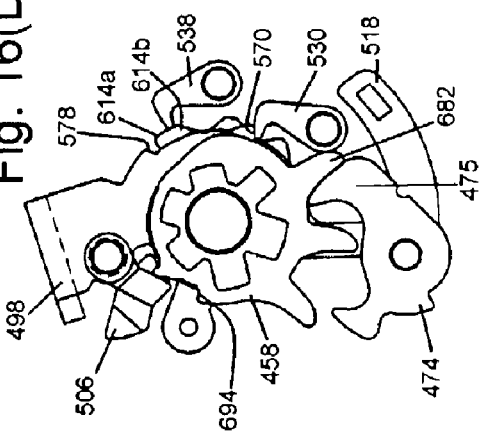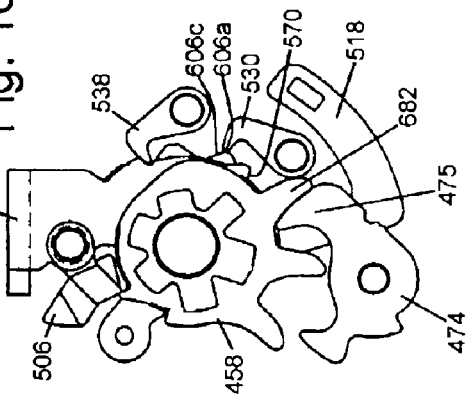

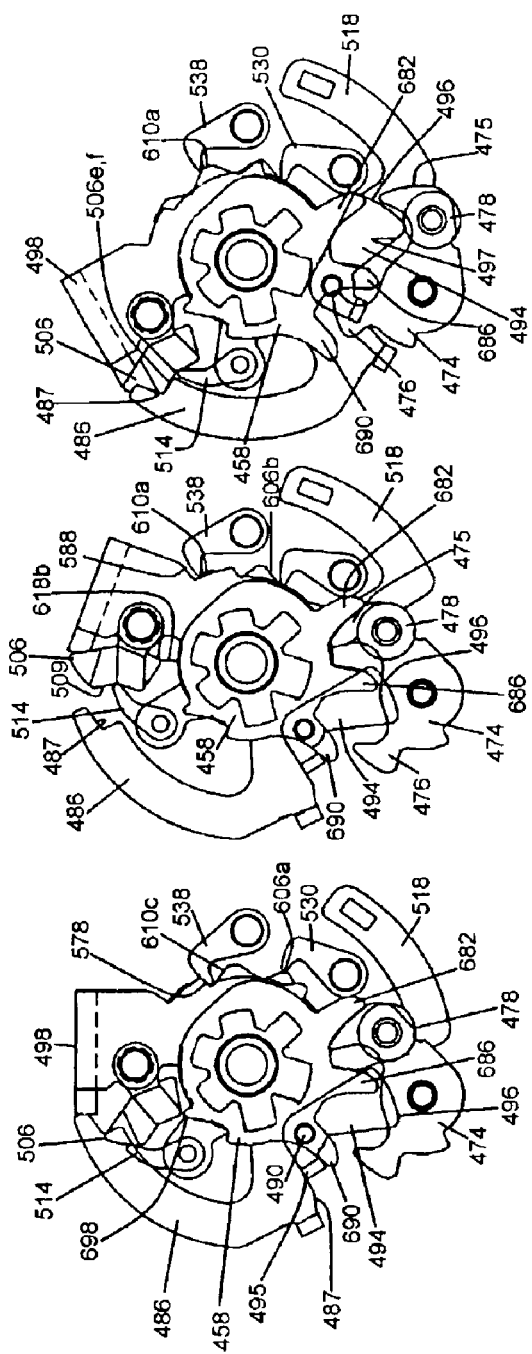

SHIFT CONTROL DEVICE FOR A BICYCLE TRANSMISSION

CROSS REFERENCE TO RELATED APPLICATION

This application is a continuation-in-part of U.S. application Ser. No. 10/190,462, filed Jul. 5, 2002.

BACKGROUND OF THE INVENTION

The present invention is directed to bicycle transmissions and, more particularly, to various features of an apparatus for assisting a speed change operation in a bicycle transmission.

Various devices have been developed to help reduce the effort needed to operate bicycle transmissions such as derailleurs and internal hub transmissions. Examples of such devices particularly suited to assist the operation of derailleur transmissions are shown in U.S. Pat. No. 5,358,451. The devices shown therein for assisting the operation of a rear derailleur employ multiple moving parts that are in constant motion, thus increasing the amount of moving mass as well as the possibility of premature wear on the components. Devices shown therein for assisting the operation of a front derailleur accommodate only two front sprockets. However, many bicycles have more than two front sprockets. Thus, there is a desire for an assist device that can be used with more than two sprockets.

Many shift control devices also have been developed to control the operation of bicycle transmissions. Such shift control devices ordinarily take the form of levers or cylindrical twist-grips that rotate to a different position for each gear position. Some shift control devices used with electrically operated transmissions have the form of buttons that are pressed by the rider. A lever that rotates to different positions requires the rider to reach to a different position for each gear in order to operate the lever, and this can be distracting during high performance riding. A twist grip does not produce such variable positioning, but the twist grip must be encircled by the hand to be operated, thus requiring a substantial amount of effort. Buttons have the disadvantage of being counterintuitive, and they require more effort to locate.

SUMMARY OF THE INVENTION

The present invention is directed to various features of an apparatus for assisting a speed change operation in a bicycle transmission. Like prior art devices, the apparatus can accommodate two front sprockets, but the apparatus also can accommodate more than two front sprockets. The apparatus also provides a shift control device that is easy to operate in an intuitive manner.

In one inventive feature, a shift control device includes a mounting unit; a transmission control element movably mounted to the mounting unit, wherein the transmission control element moves between a first transmission control position and a second transmission control position; a first transmission control element biasing mechanism for biasing the transmission control element toward the first transmission control position; and a first shift control element that moves between a first shift control position and a second shift control position. The first shift control element and the transmission control element are operatively coupled such that the transmission control element moves toward the second transmission control position when the first shift control element moves toward the second shift control position, and the transmission control element moves toward the first transmission control position as the first shift control element continues to move toward the second shift control position.

In another inventive feature, an indicator apparatus for a shift control device includes a mounting unit; a transmission control element movably mounted relative to the mounting unit, wherein the transmission control element moves between a first transmission control position and a second transmission control position; and an indicator that moves between a first indicator position and a second indicator position. An indicator coupling unit moves the indicator from the first indicator position to the second indicator position when the transmission control element moves toward the second transmission control position without moving the indicator back to the first indicator position when the transmission control element moves back toward the first transmission control position.

BRIEF DESCRIPTION OF THE DRAWINGS

FIGS. 16(A)–(E) are views illustrating the operation of the assist mechanism in an upshifting direction;

FIGS. 17(A)–(F) are views illustrating the operation of the assist mechanism in a downshifting direction;

DETAILED DESCRIPTION OF THE EMBODIMENTS

Figure 1:
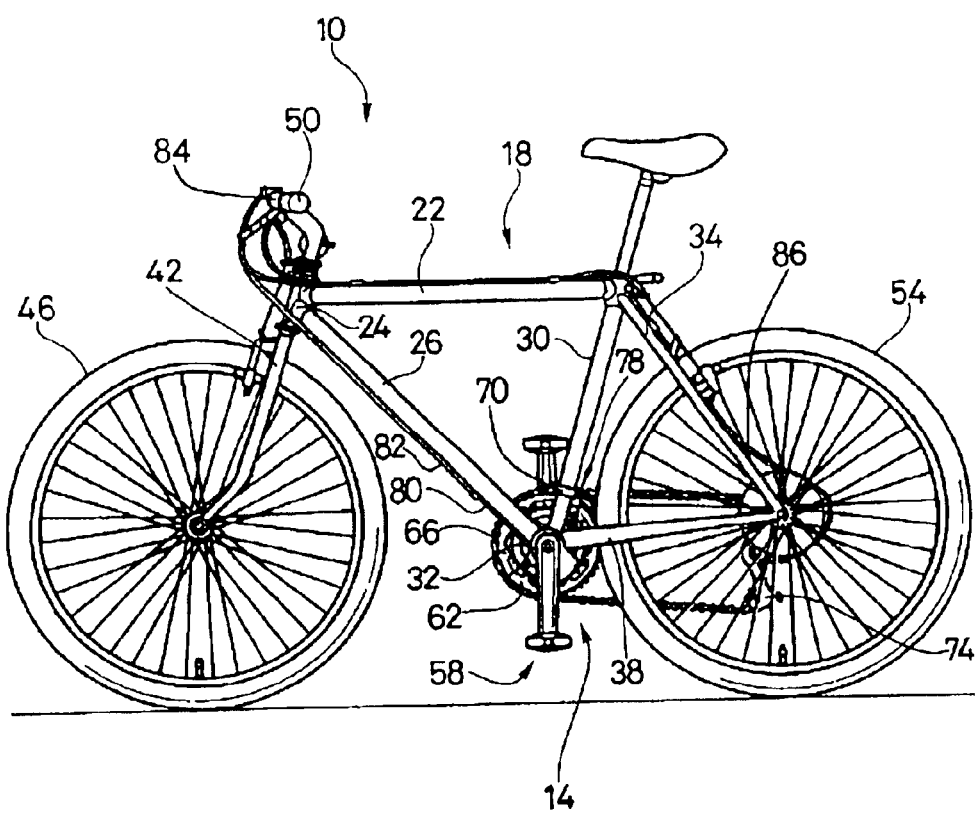
FIG. 1 is a side view of a particular embodiment of a bicycle that incorporates an apparatus according to the invention for assisting a speed change operation in a bicycle transmission.

FIG. 1 is a side view of a bicycle 10 that incorporates a particular embodiment of an assist mechanism 14 according to the invention for assisting a change speed operation in a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 extending downwardly from top tube 22, a bottom bracket 32 disposed at the junction of down tube 26 and seat tube 30, a pair of seatstays 34 extending rearwardly and downwardly from top tube 22, and a pair of chainstays 38 extending rearwardly from bottom bracket 32. A fork 42 is rotatably supported within head tube 24, and a front wheel 46 is rotatably supported to the lower end of fork 42. The rotational direction of fork 42 and wheel 46 is controlled by a handlebar 50 in a well known manner. A rear wheel 54 having a plurality of coaxially mounted freewheel sprockets (not shown) is rotatably supported at the junction of seatstays 34 and chainstays 38, and a pedal assembly 58 supporting a plurality of front (chainwheel) sprockets 62 is rotatably supported within bottom bracket 32. In this embodiment, three front sprockets 62 rotate coaxially and integrally with pedal assembly 58. A chain 66 engages one of the plurality of front sprockets 62 and one of the plurality of freewheel sprockets mounted to rear wheel 54. A front derailleur 70 moves chain 66 from one front sprocket 62 to another, and a rear derailleur 74 moves chain 66 from one freewheel sprocket to another. Both operations are well known. In this embodiment, front derailleur 70 is controlled by pulling and releasing an output control wire 78 coupled to assist mechanism 14, and assist mechanism 14 is controlled by an inner wire 80 of a Bowden-type control cable 82 connected to a shift control device 84 mounted to the left side of handlebar 50. Rear derailleur 74 is controlled by a Bowden-type control cable 86 in a conventional manner.

Figure 2:
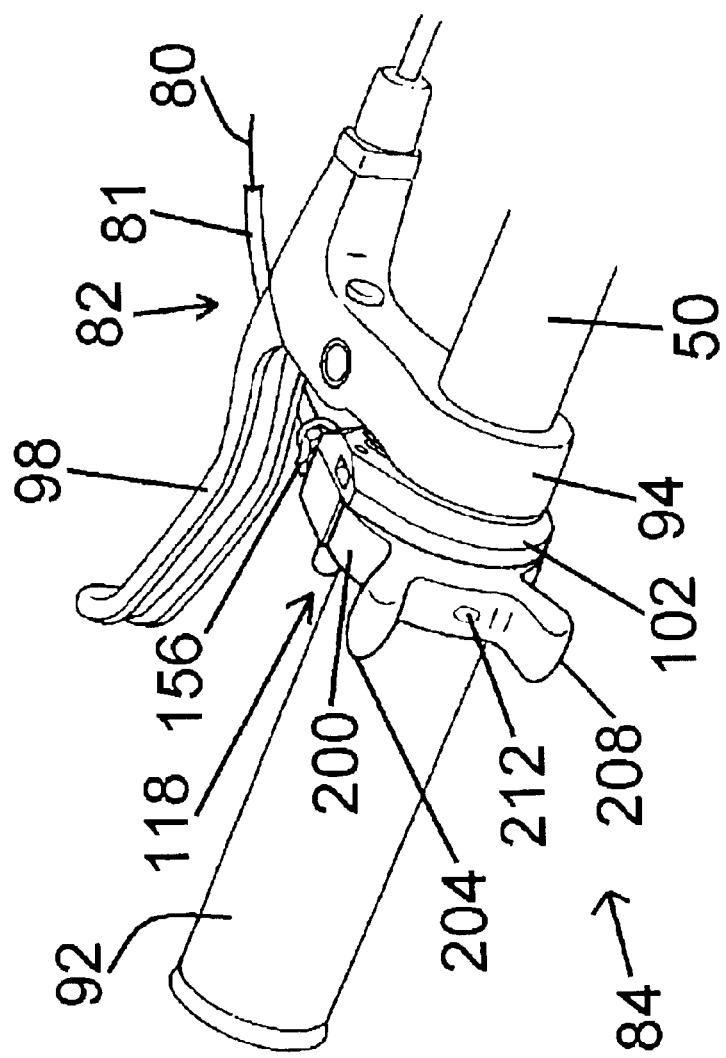
FIG. 2 is a more detailed view of the shift control device.
Figure 3:
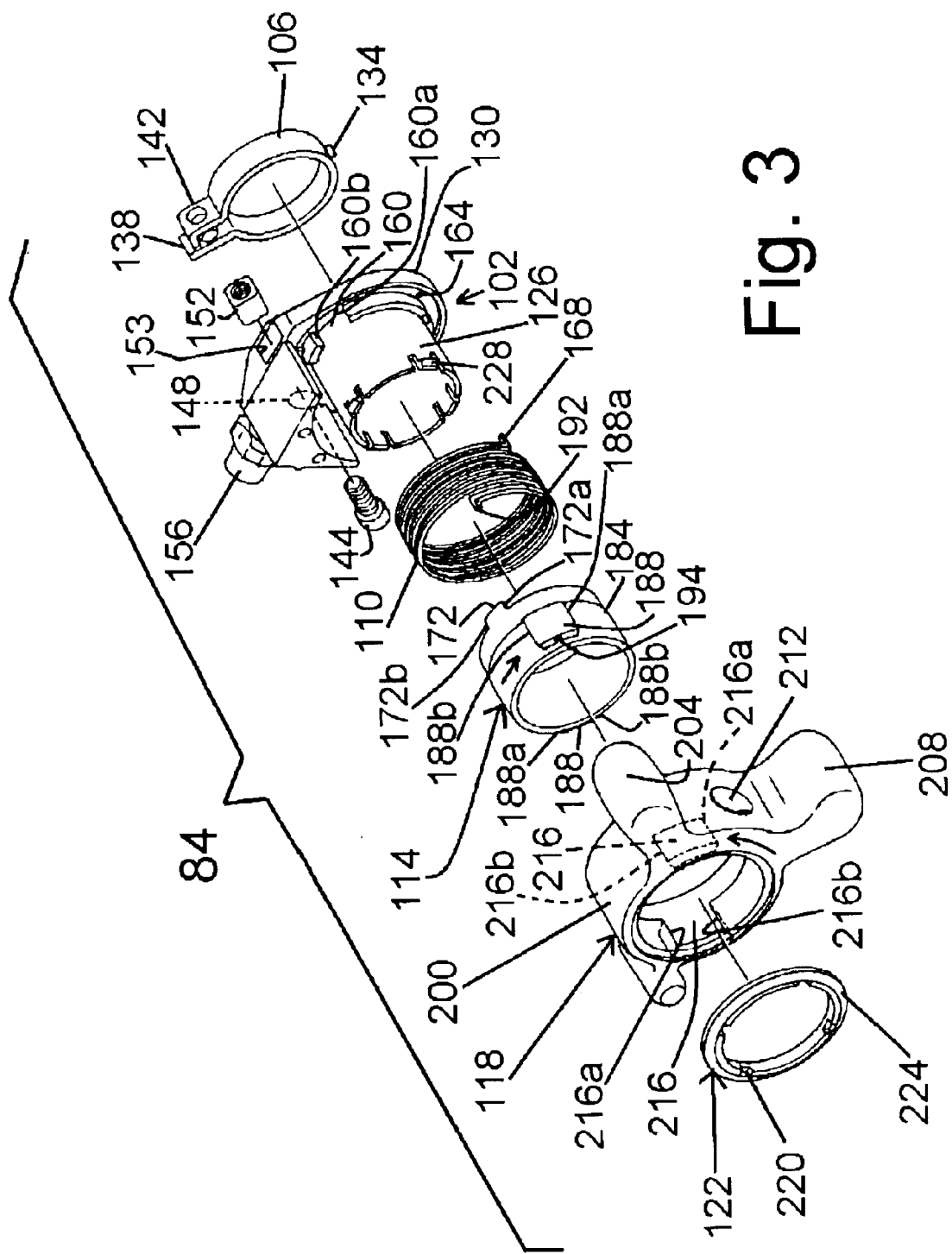
FIG. 3 is an exploded view of the shift control device shown in FIG. 2.

FIG. 2 is a view of the left side of handlebar 50 showing shift control device 84 in more detail, and FIG. 3 is an exploded view of shift control device 84. In this embodiment, shift control device 84 is mounted between a stationary handgrip 92 and a conventional brake lever bracket 94 that supports a brake lever 98. Shift control device 84 comprises a base member 102, a clamping band 106, a biasing component in the form of a spring 110, an intermediate member 114, an actuating component 118, and a retainer 122. Base member 102 comprises a tubular portion 126 and a flange portion 130. Tubular portion 126 surrounds handlebar 50, and flange portion 130 extends radially outwardly from an inner end of tubular portion 126. Clamping band 106 has a locking projection 134 and mounting ears 138 and 142, and the structure fits within an annular recess (not shown) with a locking groove formed at the inner peripheral surface of flange portion 130. A screw 144 extends through an opening 148 in flange portion 130 and through mounting ears 138 and 142 and screws into a nut 152 disposed in another opening 153 in flange portion 130 to tighten mounting ears 138 and 142 toward each other and thereby tighten clamping band 106 and fasten base member 102 to handlebar 50. A conventional screw-type adjustable control cable coupler 156 is disposed on flange portion 130 for receiving the outer casing 81 of control cable 82 in a conventional manner. Diametrically opposed recesses 160 (only one is visible in FIG. 3) having abutments 160a and 160b are formed at the junction of tubular portion 126 and flange portion 130, and a base member bias engaging component 164 in the form of a spring hole is formed in flange portion 130. An end 168 of spring 110 is fitted within spring hole 164.

Intermediate member 114 is rotatably supported on tubular portion 126 of base member 102 such that spring 110 is disposed between intermediate member 114 and flange portion 130 of base member 102. Diametrically opposed projections or stoppers 172 (only one is visible in FIG. 3) forming abutments 172a and 172b extend axially from the inner end of intermediate member 114, and a pair of diametrically opposed intermediate member projections or stoppers 188 forming abutments 188a and 188b extend radially outwardly from an outer peripheral surface 184 of intermediate member 114. An end 192 of spring 110 is fitted within a spring opening 194 (which functions as an intermediate member bias engaging component) formed in one of the stoppers 188 for biasing intermediate member 114 clockwise. As a result, abutments 172a of stoppers 172 engage abutments 160a (which function as base member stoppers) to limit the rotation of intermediate member 114 relative to base member 102.

Actuating component 118 is rotatably supported by intermediate member 114 which, as noted above, is rotatably supported by the tubular portion 126 of base member 102. Thus, actuating component 118 rotates coaxially around intermediate member 114, tubular portion 126 of base member 102, and handlebar 50. Actuating component 118 comprises a tubular member 200, first and second finger projections or levers 204 and 208 extending radially outwardly from tubular member 200, a transmission control member coupling component in the form of an opening 212 for receiving a cable end bead (not shown) attached to the end of inner wire 80 so that inner wire 80 moves integrally with actuating component 114, and diametrically opposed recesses 216 forming abutments 216a and 216b. In the assembled state, intermediate member stoppers 188 are fitted within the corresponding recesses 216 between abutments 216a and 216b so that abutments 216a and 216b function as actuating member stoppers. In this embodiment, inner wire 80 of control cable 82 is under tension as a result of a biasing component disposed in assist apparatus 14. Thus, actuating component 118 is biased in the counter-clockwise direction such that abutments 188a of intermediate member stoppers 188 engage abutments 216a to limit the rotation of actuating component 118 relative to intermediate member 114 and base member 102.

Retainer 122 is fitted around the outer end of tubular member 126 of base member 102. Retainer 122 includes four recesses 220 that are evenly formed on a side surface 224 for engaging four locking tabs 228 that extend radially outwardly from the outer end of tubular portion 126 of base member 102. Thus, retainer 122 axially fixes actuating component 118 and intermediate member 114 in place on base member 102.

Figure 4A:
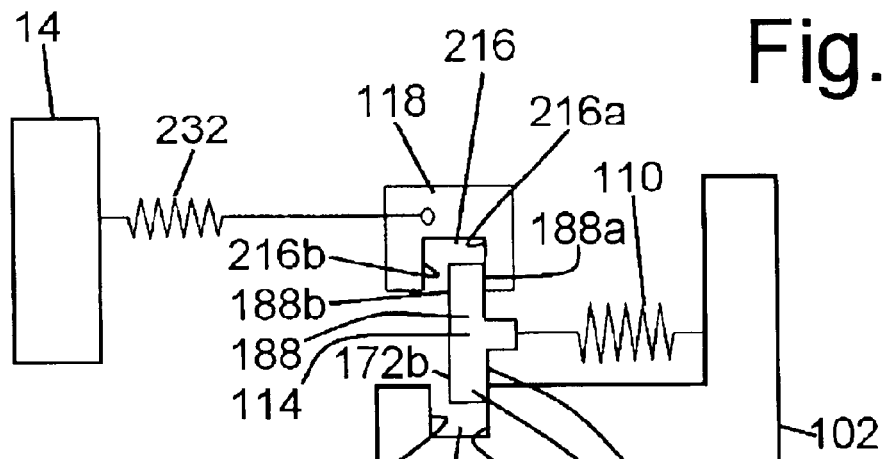
FIGS. 4(A)–4(C) are schematic views showing the operation of the shift control device.
Figure 4B:
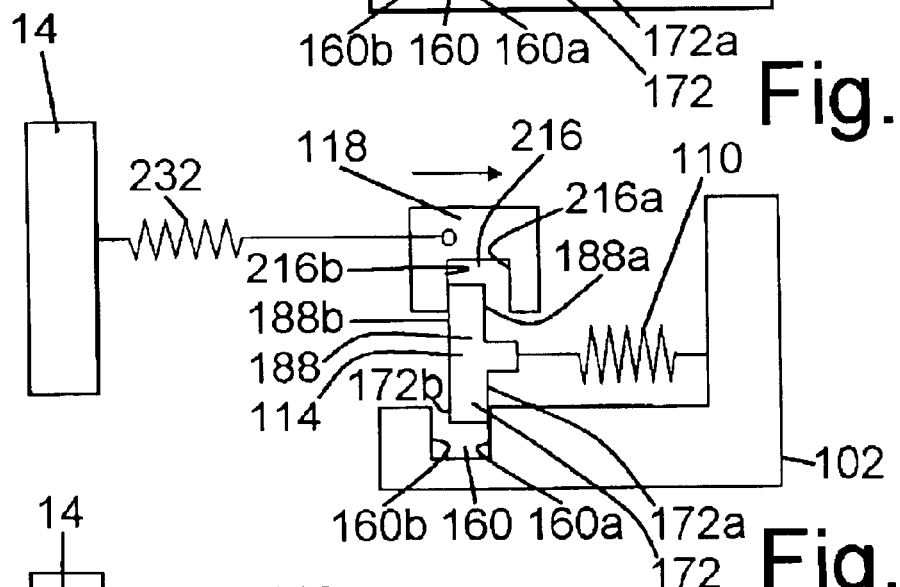
Figure 4C:
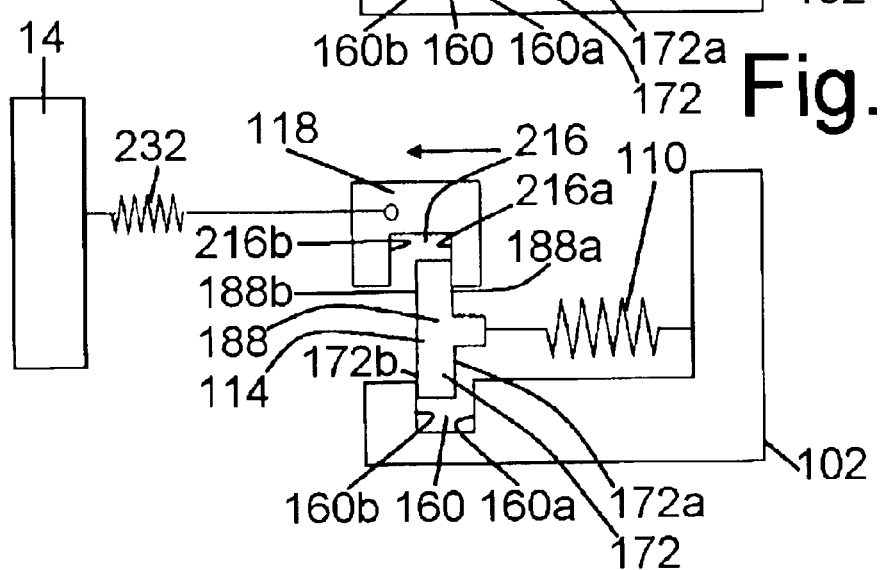

FIGS. 4(A)–4(C) schematically illustrate the operation of shift control device 84. FIG. 4(A) shows actuating component 118 in an actuating component neutral position. In this position, spring 110 biases intermediate member 114 clockwise (to the right in FIG. 4(A)) so that abutments 172a of stoppers 172 contact abutments 160a of recesses 160 on base member 102, and a biasing component (spring) in assist mechanism 14, indicated by reference number 232, biases actuating component 118 counterclockwise so that abutments 216a of recesses 216 contact abutments 188a of intermediate member stoppers 188. Thus, abutments 160a, 172a, 188a and 216a (and to some extent springs 110 and 232) function as neutral positioning components. Since inner wire 80 is directly coupled to actuating component 118, inner wire 80 likewise is in a transmission control member neutral position at this time.

Rotating actuating component 118 clockwise from the position shown in FIG. 4(A) against the biasing force of the biasing component 232 in assist mechanism 14 causes abutments 216b on actuating component 118 to contact abutments 188b on intermediate member stopper 188 as shown in FIG. 4(B). Intermediate member 114 remains stationary at this time. In FIG. 4(B), actuating component 118 is in an actuating component downshift position, and inner wire 80 is pulled into a transmission control member downshift position.

Rotating actuating component 118 counterclockwise from the position shown in FIG. 4(A) causes intermediate member 114 to rotate counterclockwise (to the left in FIG. 4(C)) against the biasing force of spring 110, since abutments 216a contact abutments 188a of intermediate member stoppers 188 and spring 110 is ultimately coupled between actuating component 118 and base member 102. As a result, actuating component 118 is in an actuating component upshift position, and inner wire 80 is released into a transmission control member upshift position.

Figure 5:
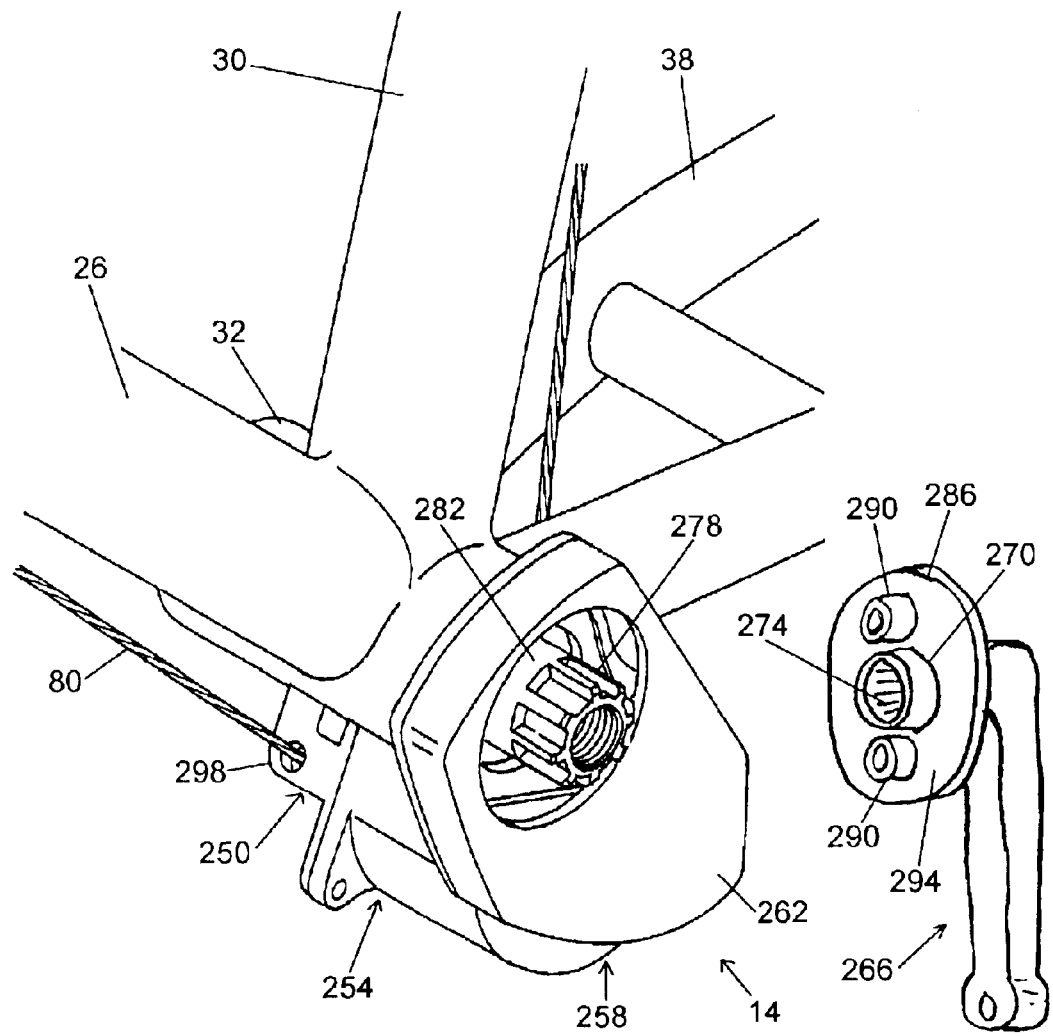
FIG. 5 is a closer view of the assist mechanism shown in FIG. 1.

FIG. 5 is a more detailed view of assist mechanism 14. As shown in FIG. 5, assist mechanism 14 is mounted to bottom bracket 32, and it includes an input unit 250, a positioning unit 254, and a rotating member engaging unit 258 with a cover 262. In this embodiment, assist mechanism 14 is used in conjunction with a crank arm 266 that includes an axle mounting boss 270 having a plurality of crank arm splines 274 that nonrotatably engage a plurality of axle splines 278 formed on the end of an axle 282 that is rotatably supported by bottom bracket 32 in a well known manner. A drive flange 286 extends radially outwardly from axle mounting boss 270 and supports a pair of diametrically opposed drive members 290. Drive members 290 have the shape of circular tubes that extend perpendicularly from the side surface 294 of drive flange 286.

Figure 6:
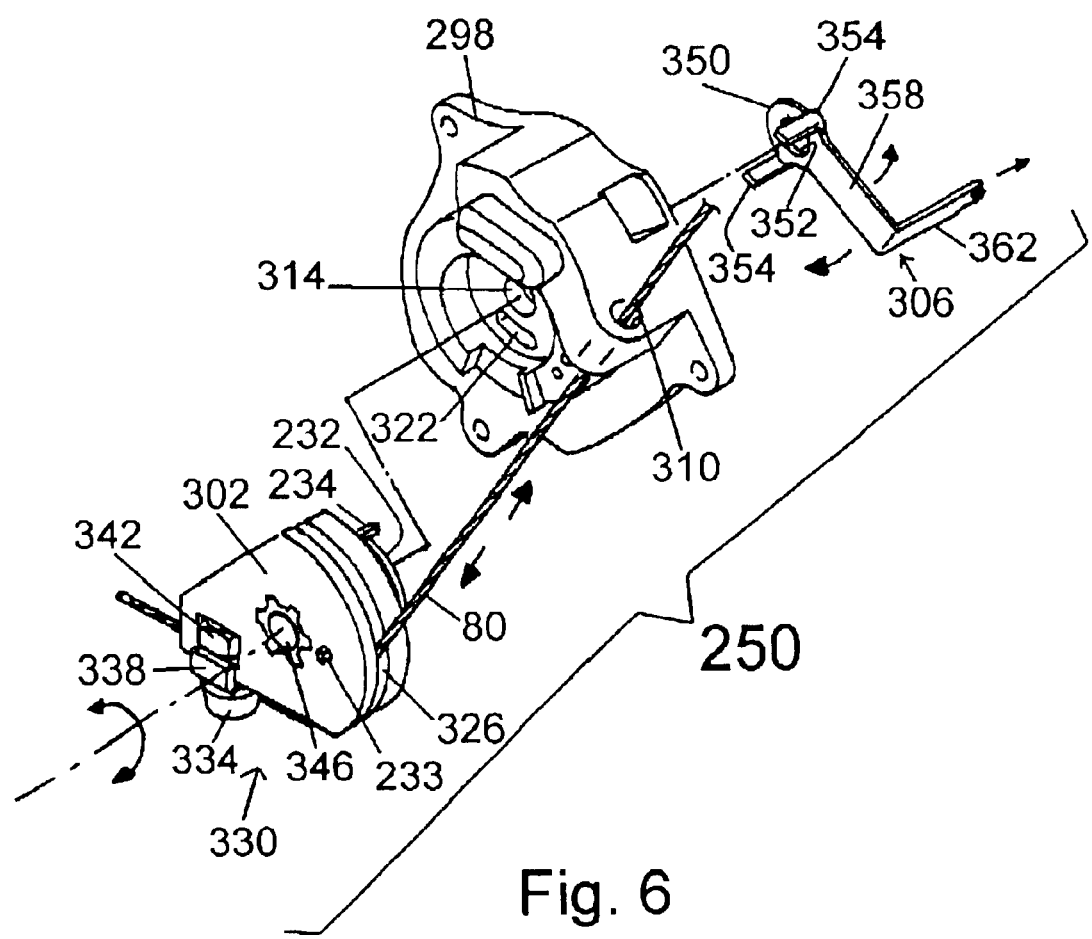
FIG. 6 is an exploded view of a particular embodiment of an input unit according to the present invention.

FIG. 6 is an exploded view of a particular embodiment of input unit 250. Input unit 250 includes an input unit mounting member 298, a wire coupling member 302, spring 232, and an input link 306. Input unit mounting member 298 has a guide channel 310 for inner wire 80, a central axle opening 314 for receiving an axle 318 (FIG. 10) of positioning unit 254 therethrough, and a pair of diametrically opposed openings 322 (only one opening is visible in FIG. 6). Wire coupling member 302 includes a wire winding groove 326 for winding and unwinding inner wire 80, a conventional wire coupler 330 in the form of a screw 334, a wire retainer 338 and a nut 342 for fixing inner wire 80 to wire coupling member 302, and an axle opening 346 for receiving axle 318 of positioning unit 254. Input link 306 functions to communicate the rotational position of wire coupling member 302 to positioning unit 254, and it includes an axle mounting portion 350 with an axle receiving opening 352, coupling tabs 354, a radially extending portion 358, and an axially extending coupling portion 362. Coupling tabs 354 extend axially from axle mounting portion 350, through openings 322 in input unit mounting member 298, and into corresponding openings (not shown) in wire coupling member 302 so that wire coupling member 302 and input link 306 rotate as a unit. Thus, both wire coupling member 302 and input link 306 will assume neutral, upshift and downshift positions corresponding to the positions of actuating component 118 of shift control device 84. Spring 232 has one end 233 mounted to wire coupling member 302 and another end 234 mounted to input unit mounting member 298 so that wire coupling member 302 and input link 306 are biased in the clockwise (wire winding) direction.

Figure 7:
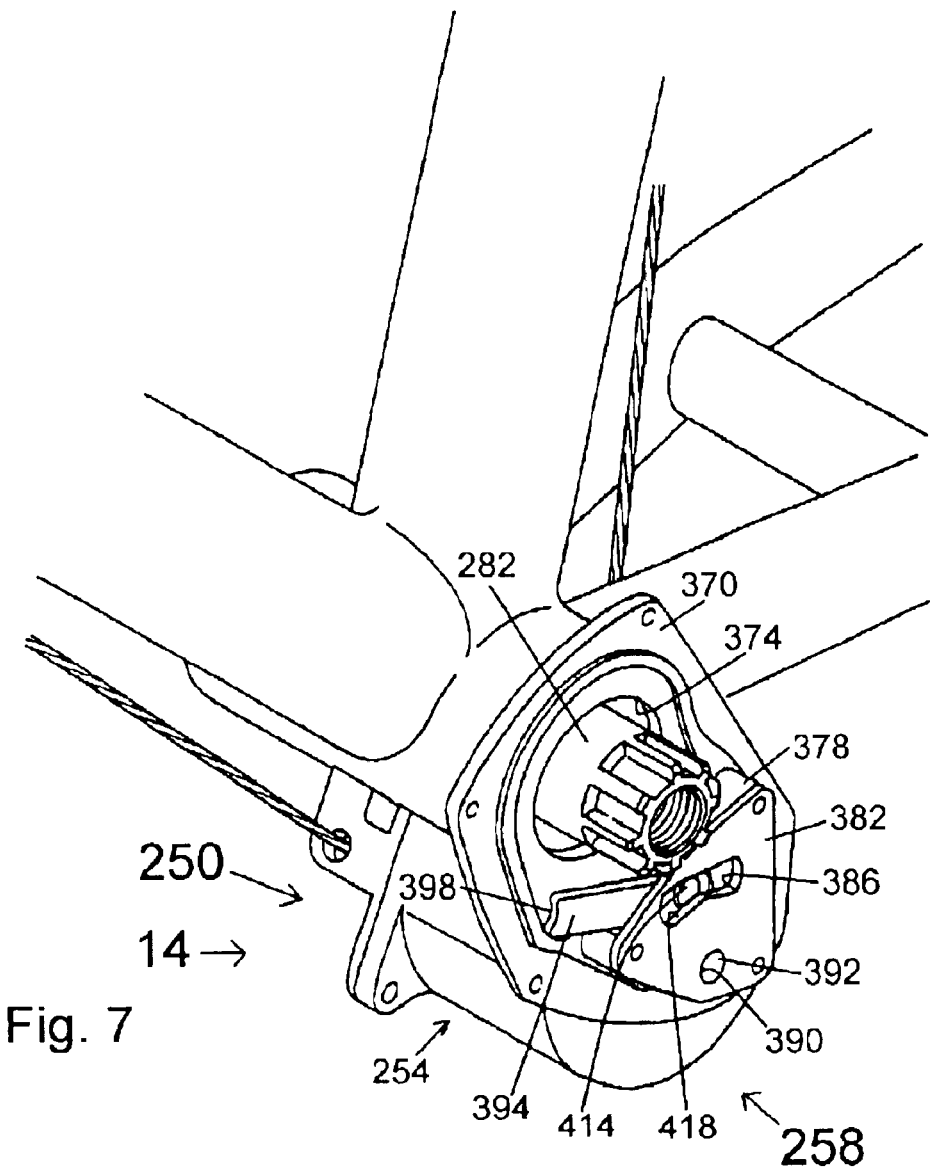
FIG. 7 is a view of the assist mechanism showing a particular embodiment of a rotating member engaging unit.
Figure 8:
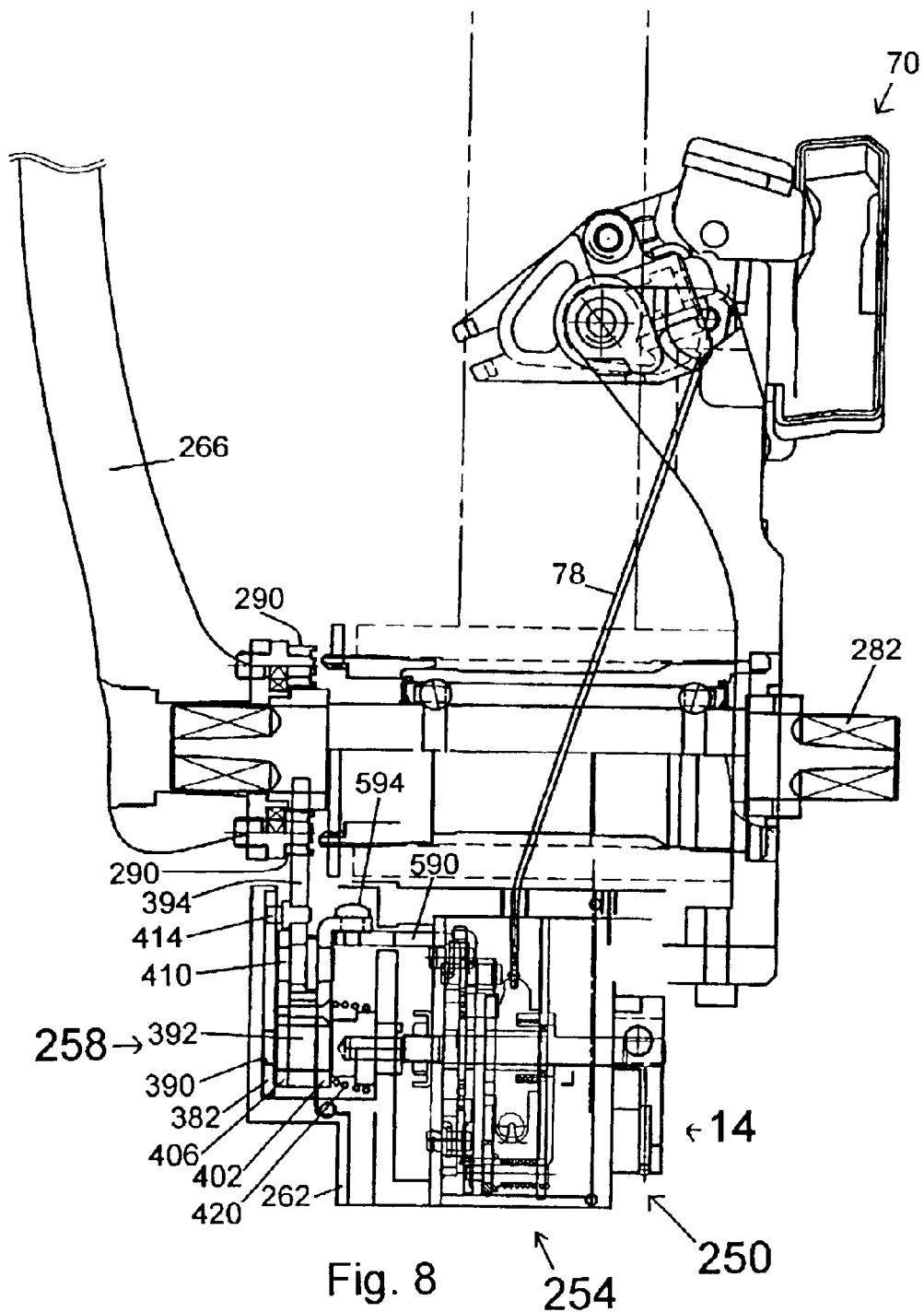
FIG. 8 is a rear cross sectional view of the assist mechanism.
Figure 9A:
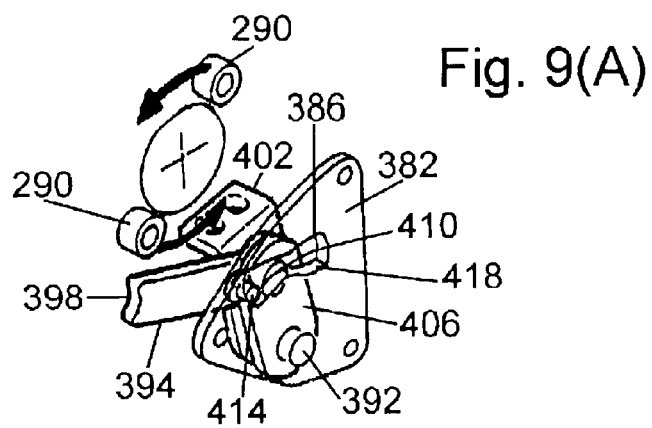
FIGS. 9(A)–9(D) illustrate the operation of the rotating member engaging member.

FIG. 7 is an oblique view of assist mechanism 14 with cover 262 of rotating member engaging unit 258 removed, FIG. 8 is a rear cross sectional view of assist mechanism 14, and FIGS. 9(A)–9(D) illustrate the operation of rotating member engaging unit 258. As shown in FIGS. 7, 8 and 9(A), rotating member engaging unit 258 includes a bottom bracket mounting member 370 with an opening 374 for receiving axle 282 therethrough, an axially extending side wall 378, a cam plate 382 with a control cam slot 386 attached to side wall 378, and an opening 390 for supporting a lower pivot shaft 392. One end of a rotating member engaging member 394 has an arcuate rotating member engaging surface 398 for engaging drive members 290 on crank arm 266. The other end of rotating member engaging member 394 is pivotably connected between a positioning unit interface plate 402 and a support plate 406 by a pivot shaft 410. A cam follower 414 that engages a control cam surface 418 formed by cam slot 386 is mounted to rotating member engaging member 394 in close proximity to pivot shaft 410. A spring 420 biases positioning unit interface plate 402 and support plate 406 in a counterclockwise direction.

Figure 9B:
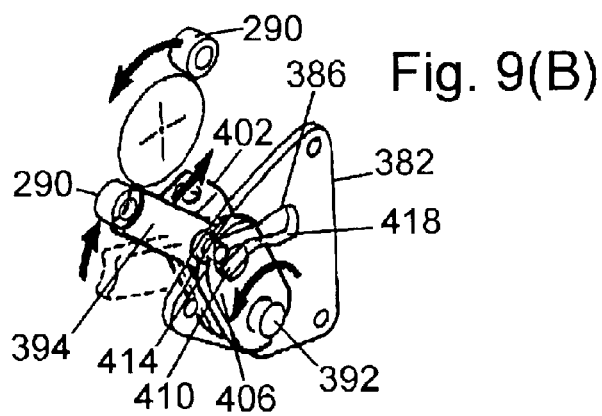
Figure 9C:
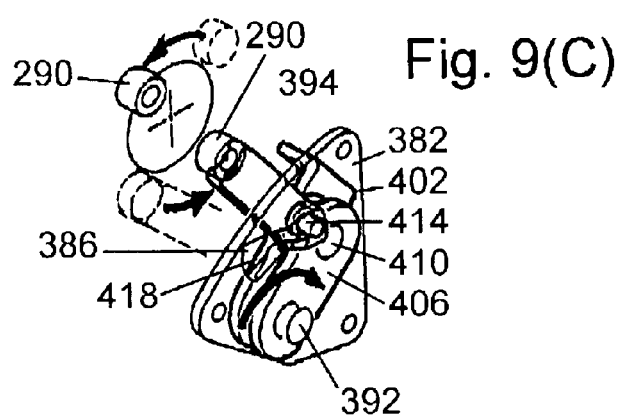
Figure 9D:
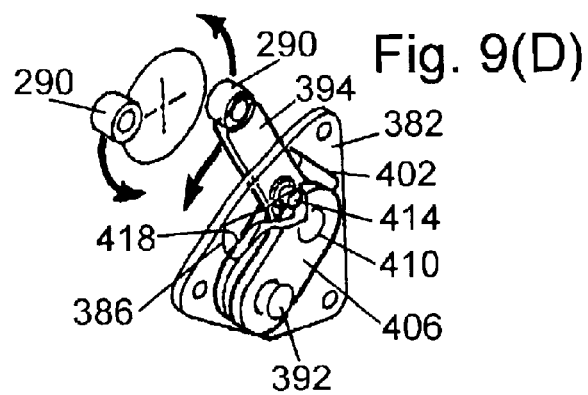

FIG. 9(A) shows rotating member engaging member 394 in a rotating member disengaging position, wherein drive members 290 rotate with crank arm 266 without causing any effect on assist mechanism 14. In general, when actuating component 118 of shift control unit 84 is rotated to either the upshift position or the downshift position, then positioning unit interface plate 402 and support plate 406 pivot counterclockwise as shown in FIG. 9(B). This causes rotating member engaging member 394 to pivot clockwise around pivot shaft 410, since cam follower 414 is retained within cam slot 386, to the rotating member engaging position shown in FIG. 9(B). In this position, rotating member engaging surface 398 is disposed in the path of drive members 290, so one of the drive members 290 will contact rotating member engaging surface 398 as shown in FIG. 9(B) and cause rotating member engaging member 394 to rotate positioning unit interface plate 402 and support plate 406 clockwise against the biasing force of spring 420 as shown in FIG. 9(C). As crank arm 266 continues to rotate, the engaged drive member 290 will disengage from rotating member engaging member 394, rotating member engaging member 394 will pivot counterclockwise as shown in FIG. 9(D) back to the rotating member disengaging position, and spring 420 will cause positioning unit interface plate 402 and support plate 406 to pivot counterclockwise back to the position shown in FIG. 9(A).

Figure 10:
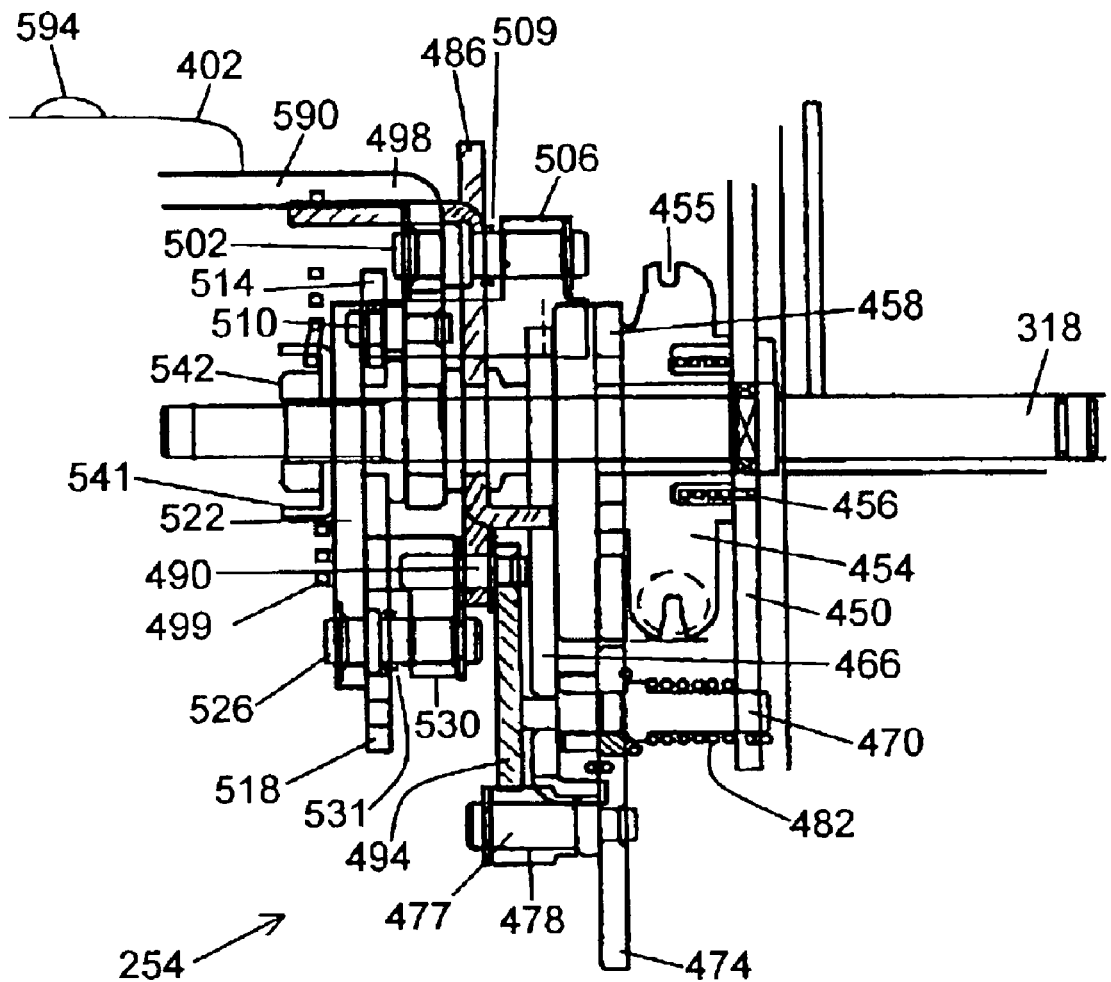
FIG. 10 is an enlarged cross sectional view of the internal components of the positioning unit shown in FIG. 8.

FIG. 10 is an enlarged rear cross sectional view of the internal components of positioning unit 254. As shown in FIG. 10, positioning unit 254 includes a base plate 450 supporting one end of a pawi shaft 470; an output transmission member in the form of a rotating member 454 rotatably supported on axle 318 and having a wire winding groove 455 for winding and unwinding output control wire 78 to a plurality of output positions; a biasing component in the form of a spring 456 for biasing rotating member 454 in a wire unwinding direction; a positioning member m the form of a positioning ratchet 458 coupled for integral rotation with rotating member 454; a middle plate 466 supporting the other end of pawi shaft 470; a position maintaining member in the form of a positioning pawl 474 supported by pawi shaft 470 for rotation between a position maintaining position and a position release position and having positioning teeth 475 and 476 FIG. 16(A)); a pivot shaft 477 mounted to positioning tooth 475; a cam follower in the form of a cam roller 478 rotatably supported by pivot shaft 477; and a pawl spring 482 connected between positioning pawl 474 and base plate 450 for biasing positioning pawi 474 toward the position maintaining position (counterclockwise in FIG. 16(A)).

Positioning unit 254 further includes a release plate 486 rotatably supported on axle 318 and having a pivot shaft 490 supporting a cam member in the form of a cam plate 494; a motion transmitting member 498 rotatably supported on axle 318; a pawl shaft 502 mounted to motion transmitting member 498; a motion transmitting pawi 506 pivotably supported on pawi shaft 502; a spring 509 for biasing motion transmitting pawi 506 in the counterclockwise direction in FIG. 16(A); another pawl shaft 510 mounted to motion transmitting member 498; a mode change pawi 514 pivotably supported on pawl shaft 510; an input transmission member in the form of a control plate 518 rotatably supported on axle 318; a base plate 522; a pawl shaft 526 mounted to base plate 522 and supporting a switch-off drive control member in the form of a drive control pawl 530; a spring 531 for biasing drive control pawi 530 in the counterclockwise direction in FIG. 16(A); a pawl shaft 534 (FIG. 16(A)) mounted to base plate 522 and supporting a switch-on drive control member in the form of a drive control pawl 538; a spring 539 for biasing drive control pawi 538 in the counterclockwise direction in FIG. 16(A); a spring retainer 541; a spring 499 connected between spring retainer 541 and motion transmitting member 498 for biasing motion transmitting member 498 in the clockwise direction in FIG. 16(A), and a retaining nut 542 for axially retaining the components on axle 318. Base plate 450, base plate 522 and axle 318 function as mounting units for the various components.

Figure 11:
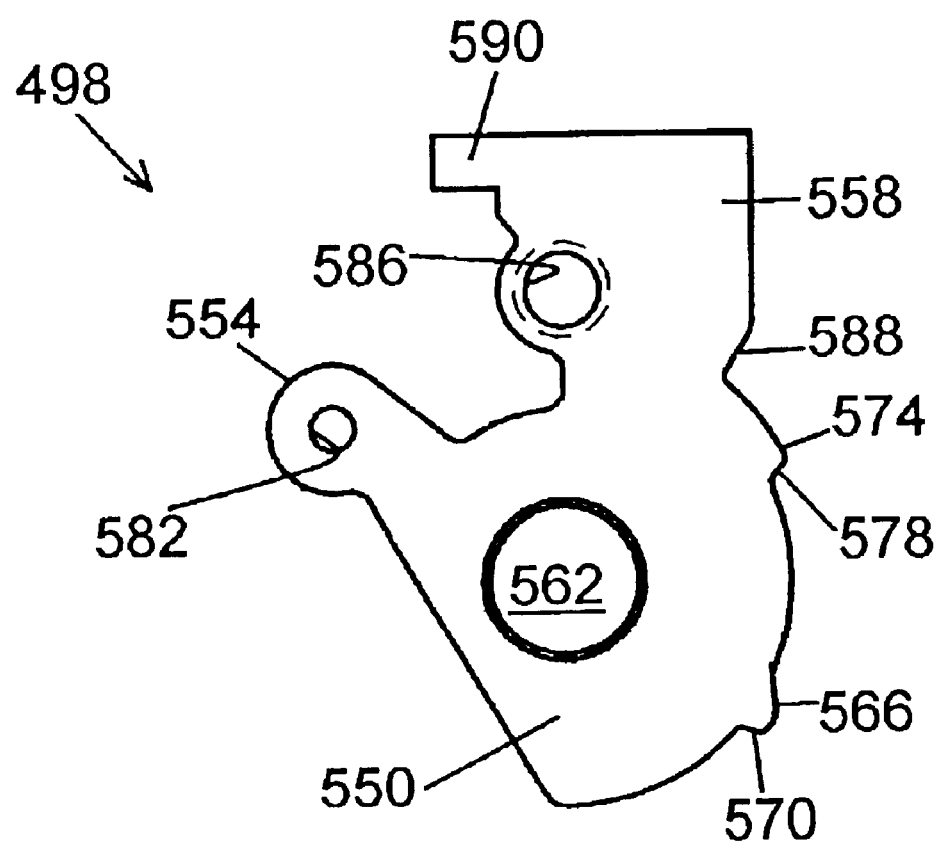
FIG. 11 is a side view of a particular embodiment of a motion transmitting member according to the present invention.

FIG. 11 is a side view of motion transmitting member 498. Motion transmitting member 498 includes a base portion 550, a pawl mounting ear 554 and a motion transmitting arm 558. Base portion 550 includes an opening 562 for receiving axle 318 therethrough, a radially outwardly extending projection 566 forming an abutment 570 for contacting drive control pawl 530, and a radially outwardly extending projection 574 forming an abutment 578 for contacting drive control pawl 538. Pawl mounting ear 554 includes an opening 582 for mounting pawl shaft 510 (which supports mode change pawl 514), and motion transmitting arm 558 likewise includes an opening 586 for mounting pawl shaft 502 (which supports motion transmitting pawl 506). Motion transmitting arm 558 also includes an abutment 588 for contacting drive control pawl 538, and an axially extending rotating member engaging unit interface plate 590 that attaches to positioning unit interface plate 402 through screws 594 as shown in FIGS. 8 and 10.

Figure 12:
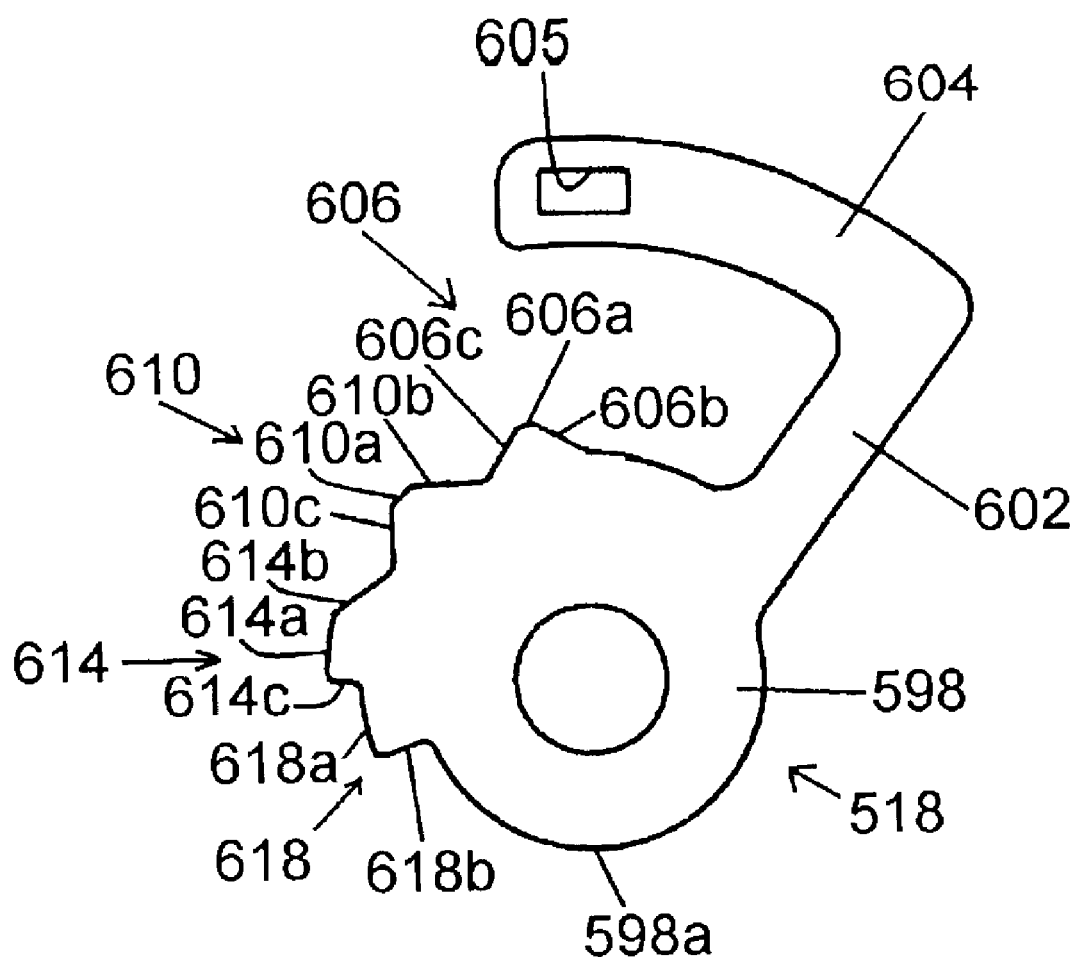
FIG. 12 is a side view of a particular embodiment of an input transmission member according to the present invention.

FIG. 12 is a side view of a particular embodiment of control plate 518. Control plate 518 includes an input control member in the form of a base portion 598, a lever arm portion 602, and an input unit interface plate 604. Input unit interface plate 604 includes an opening 605 for receiving coupling portion 362 (FIG. 6) of input link 306. Base portion 598 includes input control members in the form of radially extending drive control cam surfaces or lobes 606, 610, 614 and 618. Drive control cam lobe 606 includes an upper surface 606a and inclined ramps 606b and 606c. Similarly, cam lobe 610 includes an upper surface 610a and inclined ramps 610b and 610c. Cam lobe 614 includes an upper surface 614a, an inclined ramp 614b and a transition surface 614c extending from upper surface 614a to an upper surface 618a of cam lobe 618. Cam lobe 618 further includes a transition surface 618b extending from upper surface 618a to the outer peripheral surface 598a of base portion 598. It will become apparent from the description below that cam lobes 606, 610 and 614, drive control pawl 538 and motion transmitting member 498 with projection 578 comprise a switching mechanism to control the movement of rotating member engaging member 394 between the rotating member engaging position and the rotating member disengaging position.

Figure 13:
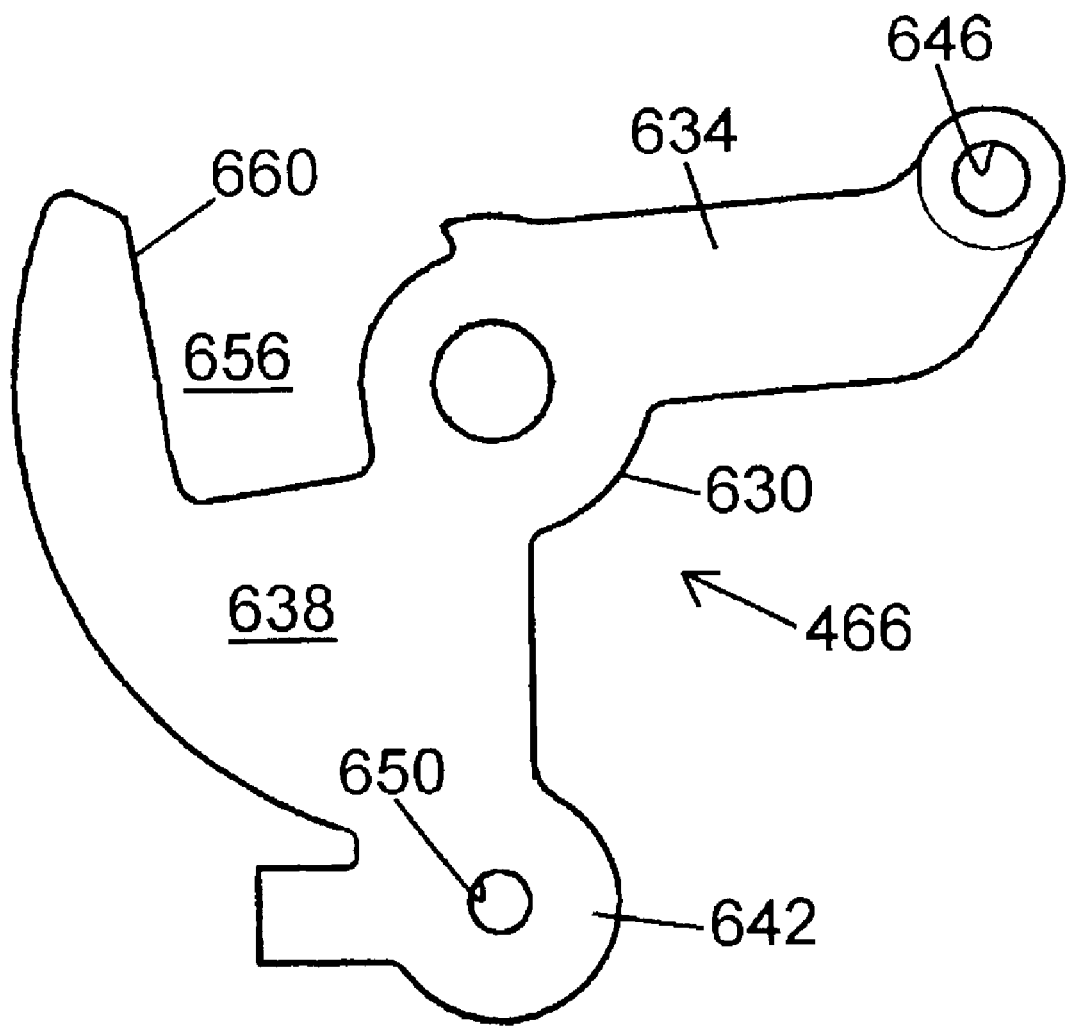
FIG. 13 is a side view of a particular embodiment of a middle plate according to the present invention.

FIG. 13 is a side view of a particular embodiment of middle plate 466. Middle plate 466 includes a base portion 630, a pawl coupling arm 634, a downshift control plate 638, and a pawl coupling portion 642 extending from downshift control plate 638. Pawl coupling arm 634 includes an opening 646 for receiving a fastener (not shown) used to attach the assembly to the housing, and pawl coupling portion 642 includes an opening 650 for attaching pawl shaft 470 (which supports positioning pawl 474). Downshift control plate 638 defines a recess 656 having a pawl control surface 660 that functions in a manner described below.

Figure 14:
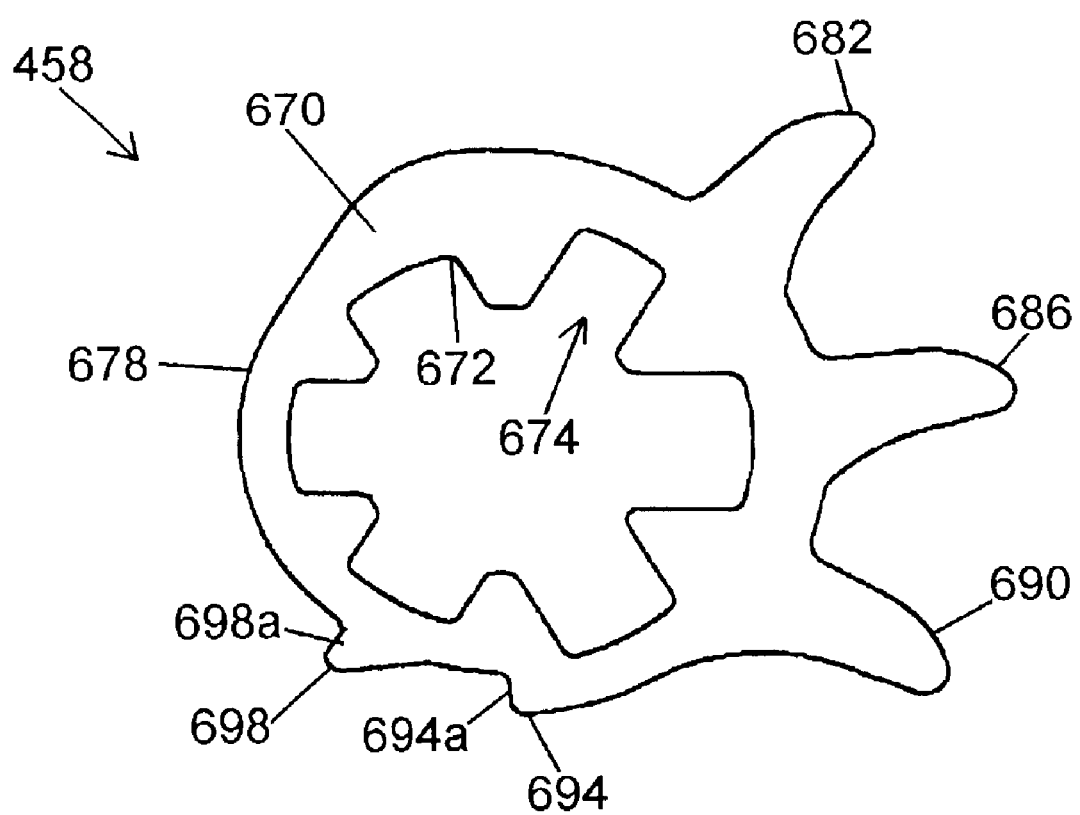
FIG. 14 is a side view of a particular embodiment of a positioning member according to the present invention.

FIG. 14 is a side view of positioning ratchet 458. Positioning ratchet 458 comprises a generally annular body 670 having an inner peripheral surface 672 forming a plurality of female splines 674 that nonrotatably engage a corresponding plurality of male splines (not shown) formed on rotating member 454 so that positioning ratchet 458 and rotating member 454 rotate as a unit. An outer peripheral surface 678 forms three positioning teeth 682, 686 and 690 and two drive teeth 694 and 698 defining drive surfaces 694a and 698a, respectively. With this structure, rotating member 454 can be set in three positions to accommodate three front sprockets 62. Such sprockets usually comprise a small diameter sprocket, an intermediate diameter sprocket, and a large diameter sprocket.

Figure 15:
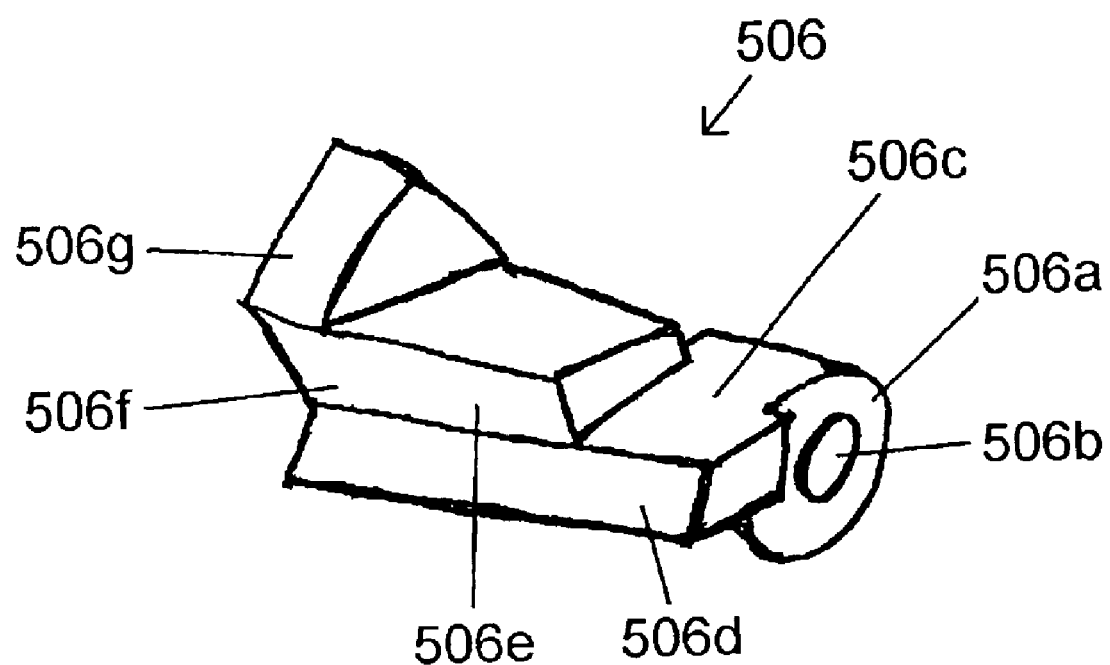
FIG. 15 is a perspective view of a particular embodiment of a motion transmitting pawl according to the present invention.

FIG. 15 is a perspective view of motion transmitting pawl 506. Motion transmitting pawl 506 includes a base portion 506a with an opening 506b for receiving pawl shaft 502, a downshift control surface 506c for contacting pawl control surface 660 of middle plate 466 in a manner described below, a positioning ratchet drive surface 506d, a release plate drive surface 506e, and mode change pawl contact surfaces 506f and 506g.

FIGS. 16(A)–(E) are views illustrating the operation of positioning unit 254 in an upshifting direction. In FIG. 16(A), positioning unit 254 is in a position such that front derailleur 70 is aligned with the small diameter front sprocket, and it is desired to move front derailleur 70 to the intermediate diameter front sprocket. In the position shown in FIG. 16(A), the tip of drive control pawl 530 is supported by the upper surface 606a of cam lobe 606, and the tip of drive control pawl 538 is located at the bottom of ramp 610c of cam lobe 610 such that drive control pawl 538 contacts abutment 578 on motion transmitting member 498 and holds motion transmitting member 498 in a "switch off" position. Thus, drive control pawl 538 and cam lobe 610 comprise a drive control mechanism that ordinarily maintains motion transmitting member 498 in the switch off position. Motion transmitting pawl 506 rests on the upper surface of drive tooth 694 on positioning ratchet 458.

The rider then rotates actuating component 118 counterclockwise (in FIG. 3) to the upshift position so that inner wire 80 is released by actuating component 118. This causes wire coupling member 302 to rotate clockwise in FIG. 6, and this motion is communicated via input link 306 to control plate 518 to rotate control plate 518 clockwise to the upshift position shown in FIG. 16(B). Clockwise rotation of control plate 518 causes drive control pawl 530 to slide down ramp 606c of cam lobe 606 and rotate counterclockwise to the position shown in FIG. 16(B). At the same time, drive control pawl 538 slides up ramp 614b of cam lobe 614 until drive control pawl 538 disengages from abutment 578 on motion transmitting member 498 and rests on upper surface 614a of cam lobe 614. Since drive control pawl 538 no longer contacts abutment 578, motion transmitting member 498 rotates clockwise until drive control pawl 538 contacts abutment 588, and motion transmitting member 498 is in a "switch on" position as shown in FIG. 16(B). Motion transmitting pawl 506, no longer being held by drive tooth 694 on positioning ratchet 458, rotates counterclockwise and rests on the outer peripheral surface 678 of positioning ratchet 458. The clockwise motion of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement is communicated to motion transmitting member 498. Positioning ratchet drive surface 506d of motion transmitting pawl 506 engages drive tooth 694 on positioning ratchet 458 and rotates positioning ratchet 458 and rotating member 454 to wind output control wire 78. During that time, positioning tooth 682 presses against pawl tooth 475 of positioning pawl 474 and rotates positioning pawl 474 clockwise until pawl tooth 475 clears the tip of positioning tooth 682. Then, positioning pawl 474 rotates counterclockwise so that pawl tooth 475 is located between positioning teeth 682 and 686 shown in FIG. 16(C).

When drive member 290 on crank arm 266 disengages from rotating member engaging member 394, positioning unit interface plate 402 and support plate 406 rotate back toward the position shown in FIG. 9(A), and this movement is communicated to motion transmitting member 498. Motion transmitting pawl 506 disengages from drive tooth 694 on positioning ratchet 458, and positioning ratchet 458 and rotating member 454 rotate clockwise in accordance with the biasing force of spring 456 until positioning tooth 682 abuts against pawl tooth 475. At this time, the front derailleur 70 is aligned with the intermediate diameter front sprocket as desired.

Assume, however, that at this time the rider has not yet rotated actuating component 118 back to the neutral position. In such a case, control plate 518 still would be in the upshift position with drive control pawl 538 resting on upper surface 614a of cam lobe 614. In this position, drive control pawl 538 would not be able to engage abutment 578 to stop the rotation of motion transmitting member 498. Thus, instead of returning to the switch off position shown in FIG. 16(A), motion transmitting member 498 would continue rotating to the switch on position shown in FIG. 16(B), rotating member engaging member 394 would return to the rotating member engaging position shown in FIG. 9(B), and another shift would result. Such an operation may be desirable in some applications and is within the scope of the present invention. However, in this embodiment drive control pawl 530 is provided to prevent such double shifts. More specifically, drive control pawl 530, having rotated counterclockwise as noted above, is now in the position to contact abutment 570 on motion transmitting member 498 and temporarily stop further rotation of motion transmitting member 498 so that motion transmitting member 498 is in the position shown in FIG. 16(D). Thus, drive control pawl 530 and cam lobe 606 comprise a drive control mechanism that inhibits rotation of motion transmitting member 498 back to the switch on position after the motion transmitting mechanism transmits motion from the rotating member engaging member 394 to rotating member 454.

When the rider returns actuating component 118 to the neutral position, control plate 518 likewise rotates back to the neutral position shown in FIG. 16(E). At that time, drive control pawl 530 slides up ramp 606c on cam lobe 606 and rotates clockwise until control pawl 530 disengages from abutment 570 on motion transmitting member 498 and the tip of control pawl 530 rests upon the upper surface 606a of cam lobe 606. Also, drive control pawl 538 slides down ramp 614b of cam lobe 614 and rotates counterclockwise so that the tip of drive control pawl 538 contacts abutment 578 on motion transmitting member 498 as shown in FIG. 16(E). Motion transmitting member 498 is now in the switch off position as shown originally in FIG. 16(A), but with positioning ratchet 458 and rotating member 454 in the position to align front derailleur 70 with the intermediate diameter front sprocket. The operation to shift from the intermediate diameter front sprocket to the large diameter front sprocket is the same.

FIGS. 17(A)–(E) are views illustrating the operation of positioning unit 254 in a downshifting direction. Some components are shown in transparent view to facilitate understanding of the operation of the components that play an important role in the downshift operation. Assume rotating member 454 is in a position such that front derailleur 70 is aligned with the intermediate diameter front sprocket (the same position shown in FIG. 16(E)), and it is desired to move front derailleur 70 to the small diameter sprocket. Accordingly, in the position shown in FIG. 17(A), the tip of drive control pawl 530 again is supported by the upper surface 606a of cam lobe 606, and the tip of drive control pawl 538 is located at the bottom of ramp 610c of cam lobe 610 such that drive control pawl 538 contacts abutment 578 on motion transmitting member 498. Motion transmitting pawl 506 rests on the upper surface of drive tooth 698 on positioning ratchet 458. Cam plate 494, which has the overall shape of a rounded and elongated isosceles triangle, includes an axially extending positioning tab 495 that abuts against a side surface 487 of release plate 486 to hold cam plate 494 in the position shown in FIG. 17(A).

The rider then rotates actuating component 118 clockwise (in FIG. 3) to the downshifted position so that inner wire 80 is pulled by actuating component 118. This causes wire coupling member 302 to rotate counterclockwise in FIG. 6, and this motion is communicated via input link 306 to control plate 518 to rotate control plate 518 counterclockwise as show in FIG. 17(B). Counterclockwise rotation of control plate 518 causes drive control pawl 530 to slide down ramp 606b of cam lobe 606 and rotate counterclockwise. At the same time, drive control pawl 538 slides up ramp 610c of cam lobe 610 and rotates clockwise until drive control pawl 538 disengages from abutment 578 on motion transmitting member 498 and rests on upper surface 610a of cam lobe 610. Since drive control pawl 538 no longer contacts abutment 578, motion transmitting member 498 rotates clockwise until drive control pawl 538 contacts abutment 588 and motion transmitting member 498 is in the switch on position shown in FIG. 17(B). This time, motion transmitting pawl 506 rotates clockwise by transition surface 618b of cam lobe 618, and mode change pawl 514 rotates clockwise to engage mode change pawl contact surface 506f on motion transmitting pawl 506 to temporarily hold motion transmitting pawl 506 in the position shown in FIG. 17(B). The movement of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement again is communicated to motion transmitting member 498, but this time release plate drive surface 506e of motion transmitting pawl 506 engages an abutment 487 on release plate 486 (which is currently in a first release member position), and release plate 486 rotates counterclockwise as shown in FIG. 17(C). Thus, motion transmitting member 498 functions as a release drive member for release plate 486 in this mode. As release plate 486 rotates, a base surface 496 of cam plate 494 contacts cam roller 478 attached to positioning pawl 474 and causes positioning pawl 474 to rotate in the clockwise direction. When the tip of pawl tooth 475 clears the tip of positioning tooth 682, positioning ratchet 458 and rotating member 454 rotate in the clockwise direction in accordance with the biasing force of spring 456 until positioning tooth 686 abuts against pawl tooth 476 to prevent uncontrolled rotation of positioning ratchet 458 and rotating member 454.

As release plate 486 continues to rotate counterclockwise toward a second release member position (the end of the range of motion of release plate 486), cam roller 478 reaches the rounded corner or cam lobe 497 of cam plate 494, thus causing cam plate 494 to rotate in the counterclockwise direction as shown in FIG. 17(C). This, in turn, allows positioning pawl 474 to rotate in the counterclockwise direction so that pawl tooth 476 moves away from positioning tooth 686 to allow positioning ratchet 458 and rotating member 454 to continue rotating in the clockwise direction until rotating member 454 is positioned so that front derailleur 70 is aligned with the smaller diameter sprocket.

If this system operated according to known systems which use a positioning pawl and positioning ratchet to control the shifting operation, the pawl tooth 476 would remain engaged with positioning tooth 686 until release plate 486 reversed direction (i.e., rotated in the clockwise direction) to complete the shifting operation. This is not necessary with a shift control mechanism constructed according to the present invention, since the rotatable cam plate 494 allows the positioning pawl 474 to immediately complete the shifting operation even when release plate 486 is still rotating in the counterclockwise direction. Thus, release plate 486 and cam plate 494 can be considered a release control mechanism that moves positioning pawl 474 to the position release position as release plate 486 moves toward the second release member position and allows positioning pawl 474 to return to the position maintaining position as release plate 486 continues to move toward the second release member position.

Figure 18A:
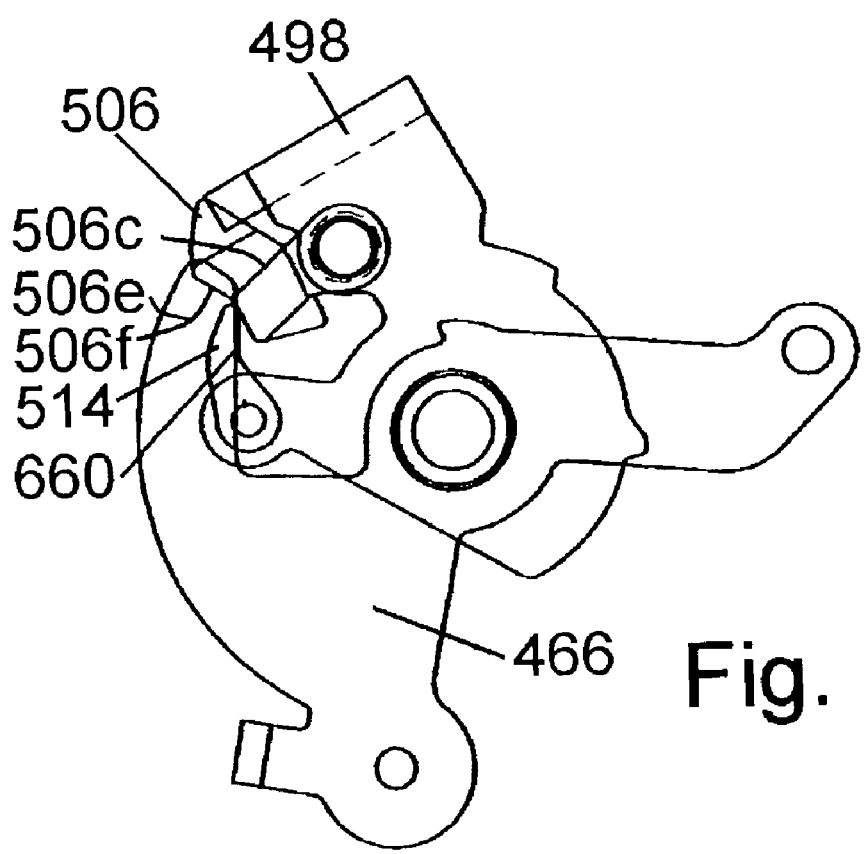
FIGS. 18(A) and 18(B) are views illustrating the cooperation of the motion transmitting pawl with the middle plate during a downshifting operation.
Figure 18B:
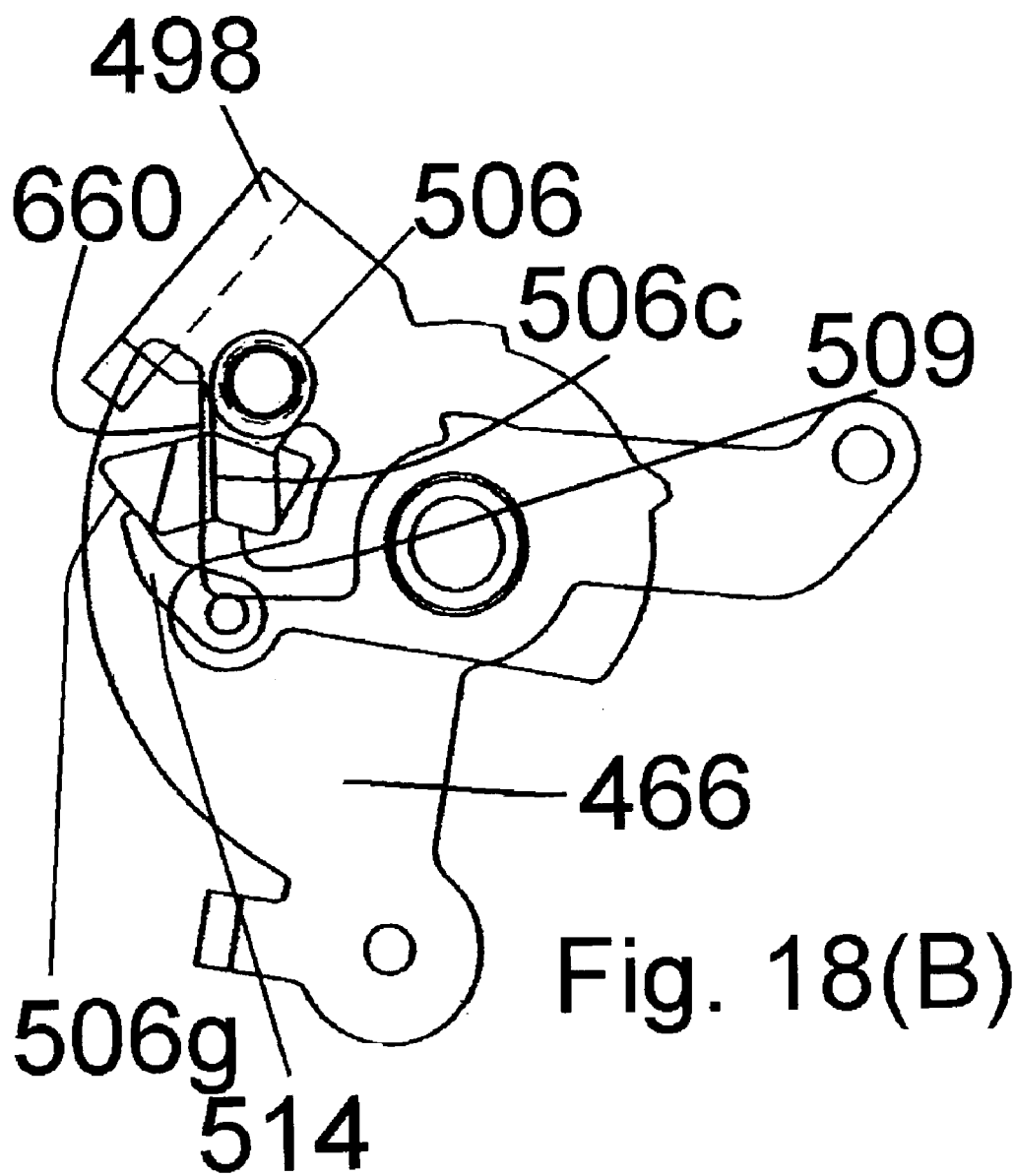

Another advantageous feature of the preferred embodiment is the manner in which the release plate 486 is allowed to reverse direction even when motion transmitting member 498 is still rotating in the counterclockwise direction. According to the preferred embodiment, when the motion transmitting member 498 is located in the position shown in FIGS. 17(C) and 18(A), downshift control surface 506c of motion transmitting pawl 506 begins to contact the pawl control surface 660 of middle plate 466 as shown in FIG. 18(A). Further rotation of motion transmitting member 498 causes motion transmitting pawl 506 to rotate counterclockwise as shown in FIGS. 17(D) and 18(B) which, in turn, causes motion transmitting pawl 506 to disengage from release plate 486. Mode change pawl 514 also disengages from mode change pawl contact surface 506f of motion transmitting pawl 506 and rests on mode change pawl contact surface 506g. Consequently, release plate 486 is allowed to return immediately to the position shown in FIG. 17(D), even when motion transmitting member 498 is still in the counterclockwise position shown in FIG. 17(D).

When drive member 290 on crank arm 266 disengages from rotating member engaging member 394, positioning unit interface plate 402 and support plate 406 again rotate back toward the position shown in FIG. 9(A), and this movement is communicated to motion transmitting member 498. Once again, assume that the rider has not yet rotated actuating component 118 back to the neutral position. In such a case, control plate 518 is still in the downshift position with drive control pawl 538 resting on upper surface 610a of cam lobe 610, but drive control pawl 530 contacts abutment 570 on motion transmitting member 498 so that motion transmitting member 498 is in the pause position shown in FIG. 17(E).

When the rider returns actuating component 118 to the neutral position, control plate 518 likewise rotates clockwise back to the neutral position shown in FIG. 17(F). At that time, drive control pawl 530 slides up ramp 606b of cam lobe 606 and rotates clockwise until drive control pawl 530 disengages from abutment 570 on motion transmitting member 498 and the tip of drive control pawl 530 rests upon upper surface 606a of cam lobe 606. At the same time, drive control pawl 538 slides down ramp 610c of cam lobe 610 and rotates counterclockwise so that the tip of drive control pawl 538 contacts abutment 578 on motion transmitting member 498 as shown in FIG. 17(F). Motion transmitting member 498 is now in the switch off position originally shown in FIG. 17(A), but positioning ratchet 458 and rotating member 454 are in the position to align front derailleur 70 with the small diameter front sprocket.

The operation to shift from the large diameter front sprocket to the intermediate diameter front sprocket is the same. However, in this case positioning ratchet 458 would be positioned initially such that pawl tooth 475 abuts against positioning tooth 686. As positioning pawl 474 rotates clockwise in response to pressure from cam plate 494, pawl tooth 475 clears positioning tooth 686, and positioning ratchet 458 rotates counterclockwise until positioning tooth 690 contacts pawl tooth 476. When positioning pawl 474 rotates counterclockwise as the cam lobe 497 of cam plate 494 reaches cam roller 478, pawl tooth 475 enters the space between positioning teeth 682 and 686, and pawl tooth 476 releases positioning tooth 690 so that positioning ratchet 458 and rotating member 454 rotate clockwise until positioning tooth 682 contacts pawl tooth 475, thus maintaining positioning ratchet 458 and rotatable member 454 in the position shown in FIG. 17(A).

Figure 19B:
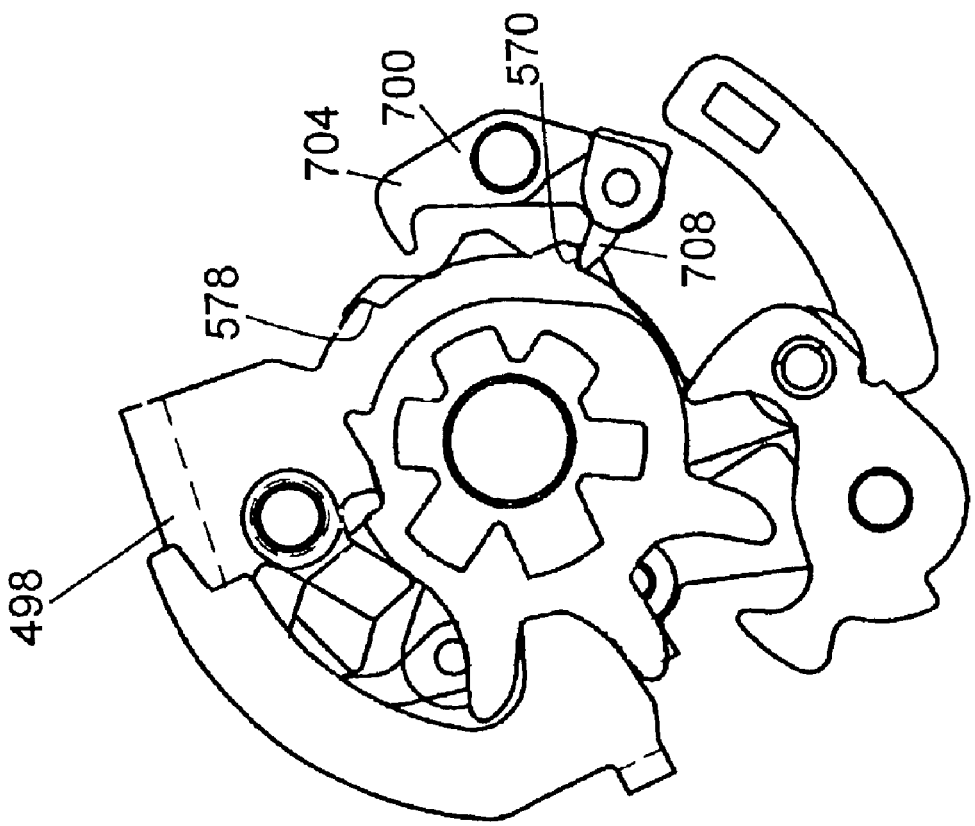
FIGS. 19(A) and 19(B) are views of an alternative embodiment of a drive control mechanism according to the present invention.
Figure 19A:
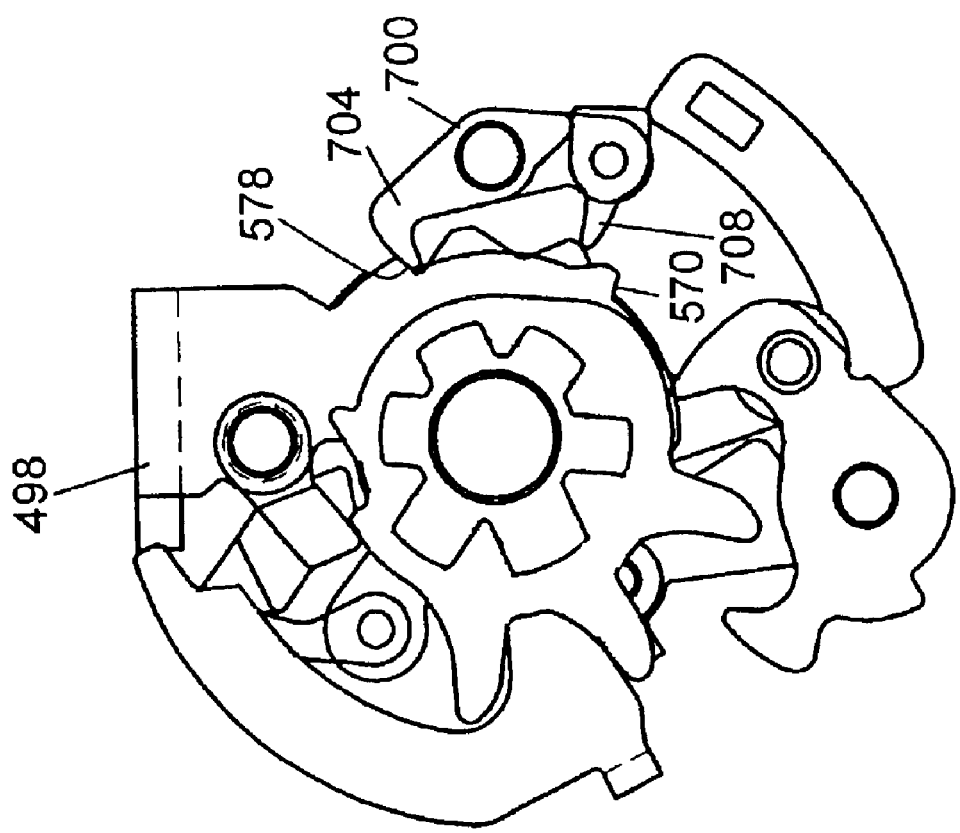

While the above is a description of various embodiments of the present invention, further modifications may be employed without departing from the spirit and scope of the present invention. For example, while separately operated drive control pawls 530 and 538 were provided in the preferred embodiment, the embodiment shown in FIGS. 19(A) and 19(B) show a single drive control pawl 700 with pawl teeth 704 and 708. Pawl tooth 704 contacts abutment 578 on motion transmitting member 498 when motion transmitting member 498 is in the home position as shown in FIG. 19(A). Pawl tooth 708 contacts abutment 570 on motion transmitting member 498 when motion transmitting member 498 is rotating clockwise to the switch off position and control plate 486 has not yet rotated to the neutral position as shown in FIG. 19(B).

Figure 20:
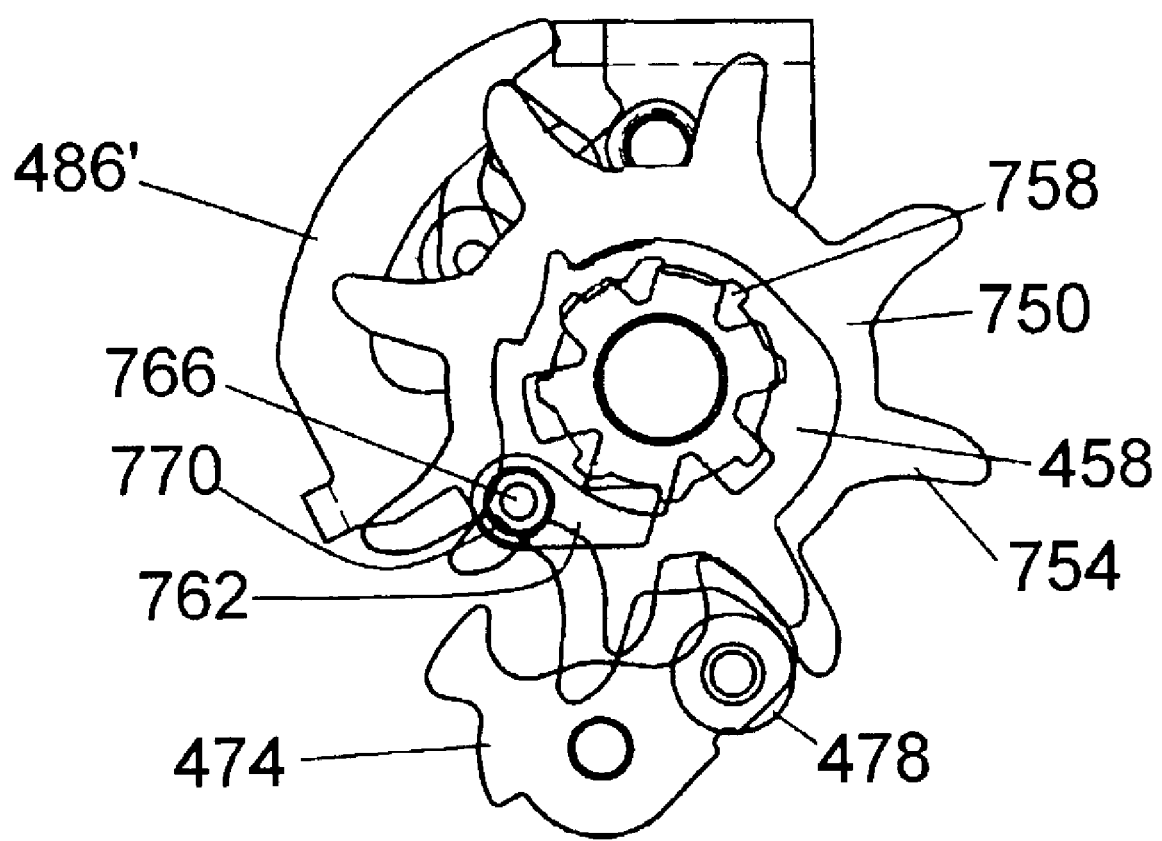
FIG. 20 is a side view of an alternative embodiment of a release mechanism according to the present invention.

While a cam plate 494 was used to control positioning pawl 474 in a downshifting operation in the preferred embodiment, FIG. 20 shows an embodiment wherein a cam wheel 750 controls the operation of positioning pawl 474. In this embodiment, cam wheel 750 is coaxially and rotatably mounted relative to positioning ratchet 458. Cam wheel 750 includes a plurality of circumferentially disposed cam teeth 754 and a plurality of circumferentially disposed cam drive teeth 758. A cam drive pawl 762 is pivotally mounted to a release plate 486' through a pivot shaft 766 and biased in a counterclockwise direction by a spring 770. When release plate 486' rotates in the counterclockwise direction during a downshift operation, cam drive pawl 762 engages one of the plurality of cam drive teeth 758 and rotates cam wheel 750 in the counterclockwise direction. One of the plurality of cam teeth 754 presses against cam roller 478 and causes positioning pawl 474 to rotate in the clockwise direction in the same manner as in the preferred embodiment. When the cam tooth 754 passes cam roller 478, positioning pawl 474 rotates in the counterclockwise direction to complete the downshift operation. Cam drive pawl 762 disengages from the corresponding cam drive tooth 758 when release plate 486' rotates in the clockwise direction.

Figure 21:
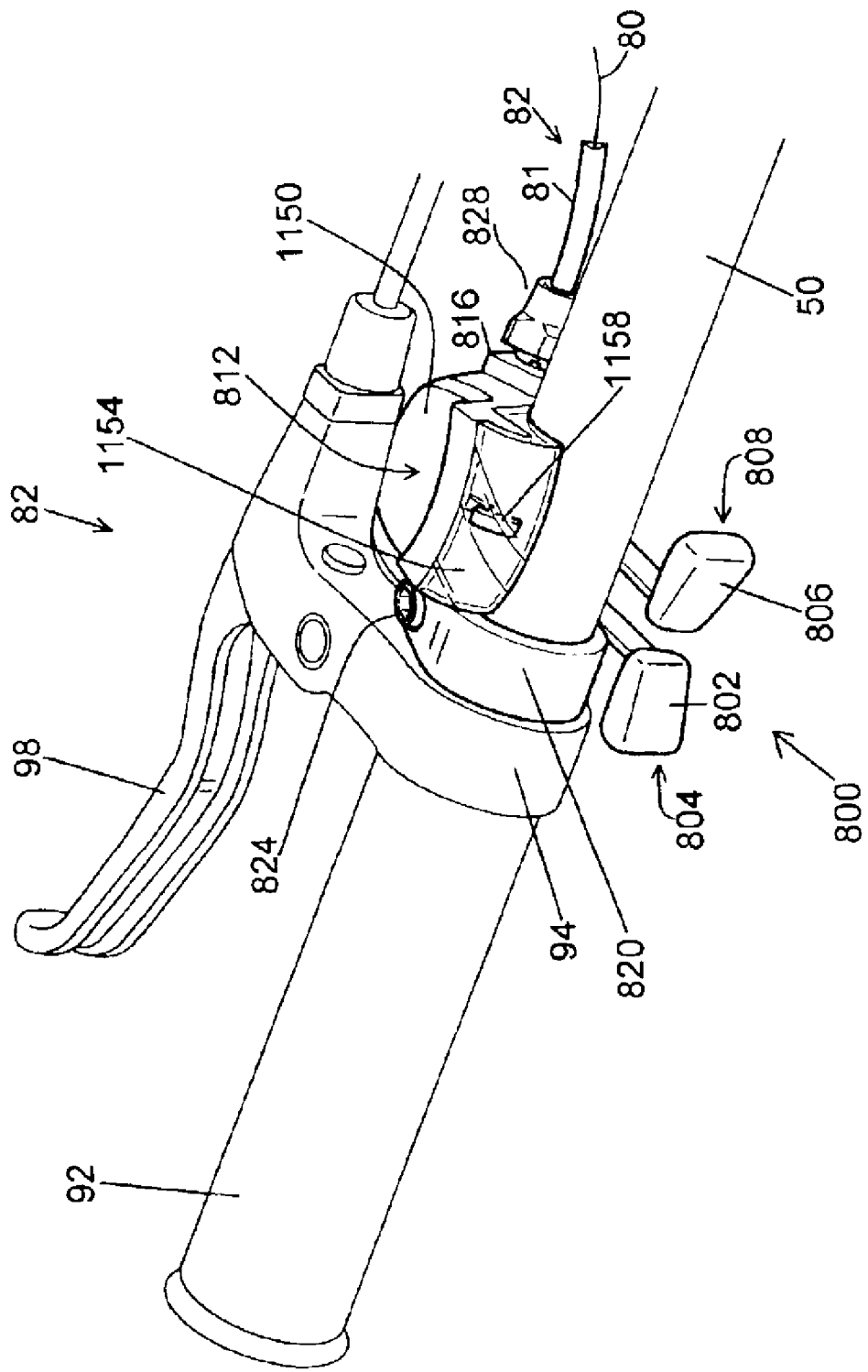
FIG. 21 is a detailed view of an alternative embodiment of a shift control device.
Figure 22:
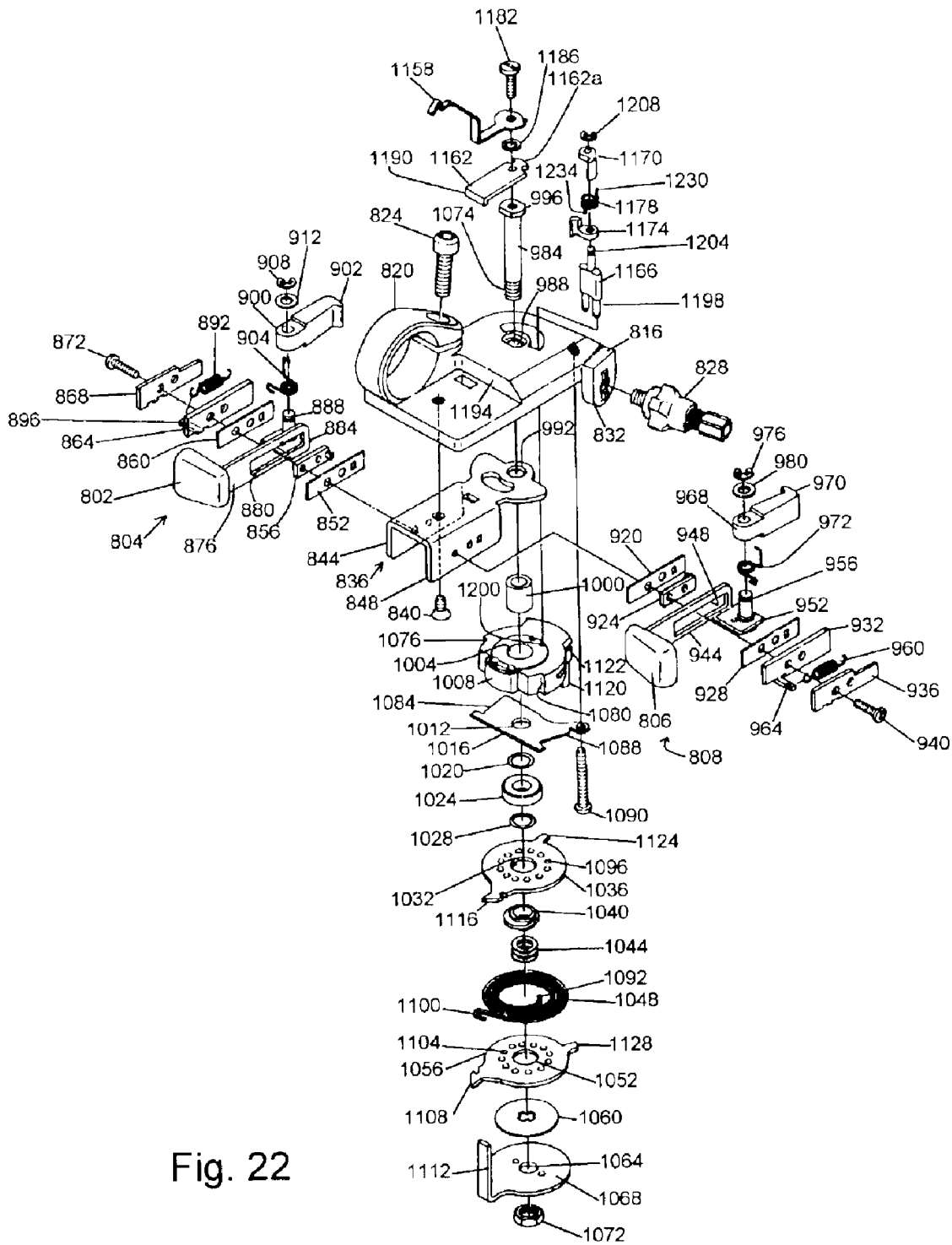
FIG. 22 is an exploded view of the shift control device shown in FIG. 21.

FIG. 21 is a detailed view of an alternative embodiment of a shift control device 800 that may be used with assist mechanism 14, and FIG. 22 is an exploded view of shift control device 800. In this embodiment, shift control device 800 is mounted on handlebar 50 inwardly adjacent to brake lever bracket 94. Shift control device 800 comprises a mounting unit such as a base member 816 that includes an integrally formed clamping band 820 for clamping shift control device 800 to handlebar 50 with a screw 824 in a known manner. A screw-type adjustable control cable coupler 828 is screwed into a flange portion 832 of base member 816 for receiving the outer casing 81 of control cable 82 in a conventional manner. In general, inner wire 80 of control cable 82 is released by pressing a finger contact portion 802 of a shift control element such as an actuating member 804, inner wire 80 of control cable 82 is pulled by pressing a finger contact portion 806 of a shift control element such as an actuating member 808, and the currently selected gear is indicated by a gear indicator unit 812.

An actuating member support 836 having side walls 844 and 848 is mounted to the underside of base member 816 by a screw 840. A support 852, an actuating member guide 856, a support 860, a bias support plate 864, and a support 868 are mounted to side wall 844 through screws 872 (only one such screw is shown in FIG. 22). Actuating member 804 includes an elongated portion 876 extending from finger contact portion 802 with an opening 880 that surrounds actuating member guide 856 so that actuating member 804 moves (e.g., slides) in a direction generally perpendicular to handlebar 50 between a first shift control position, such as a home position shown in FIG. 21, and a second shift control position, such as an innermost pressed position shown in FIG. 24(D). A pawl support base 884 extends laterally from a distal end of elongated portion 876, and a pawl shaft 888 extends upwardly from pawl support base 884. A spring 892 is connected between a ledge 896 on bias support plate 864 and pawl support base 884 for biasing actuating member 804 toward the home position. A shift control drive member such as a pawl 900 including a shift control abutment (e.g., tooth) 902 is pivotably supported by pawl shaft 888 and is biased in the clockwise direction by a drive member biasing mechanism such as a pawl spring 904 mounted between pawl support base 884 and pawl 900. Pawl 900 is retained on pawl support shaft 888 by a clip 908 and a washer 912.

Similarly, a support 920, an actuating member guide 924, a support 928, a bias support plate 932 and a support 936 are mounted to side wall 848 through screws 940 (only one such screw is shown in FIG. 22). Actuating member 808 includes an elongated portion 944 extending from finger contact portion 806 with an opening 948 that surrounds actuating member guide 924 so that actuating member 808 moves (e.g., slides) in a direction generally perpendicular to handlebar 50 between one shift control position, such as a home position shown in FIG. 21, and another shift control position, such as an innermost pressed position. A pawl support base 952 extends laterally from a distal end of elongated portion 944, and a pawl shaft 956 extends upwardly from pawl support base 952. A spring 960 is connected between a ledge 964 on bias support plate 932 and pawl support base 952 for biasing actuating member 808 toward the home position. A shift control drive member such as a pawl 968 including a shift control abutment (e.g., tooth) 970 is pivotably supported by pawl shaft 956 and biased in the counterclockwise direction by a drive member biasing mechanism such as a pawl spring 972 mounted between pawl support base 952 and pawl 968. Pawl 968 is retained on pawl support shaft 956 by a clip 976 and a washer 980.

A bolt 984 extends through an opening 988 in base member 816 and through an opening 992 in actuating member support 836 such that a head 996 of bolt 984 is substantially even with the upper surface of base member 816. Bolt 984 further extends through a bushing 1000, which is fitted within a central opening 1004 of a transmission control element such as a wire takeup element 1008, through an opening 1012 in a release plate 1016, through washers 1020 and 1028 and spacer 1024, through a central opening 1032 in a biasing plate 1036, through a spacer 1040 and washers 1044, through the interior of a radially coiled spring 1048, through a central opening 1052 of a biasing plate 1056, through a washer 1060, and through a central opening 1064 in a bias stopper plate 1068. These elements are retained on bolt 984 by a nut 1072 that screws onto a threaded end 1074 of bolt 984.

Wire takeup element 1008 includes transmission control driven members such as transmission control abutments 1076 and 1080, a downwardly extending bias engaging member 1120, and a wire winding groove 1122 for winding and unwinding inner wire 80 of control cable 82. Release plate 1016 is fixed to base member 816 through a screw 1090, and it includes release members such as cam surfaces 1084 and 1088. The foregoing elements function in a manner described below.

Biasing plate 1036 includes a radially outwardly extending stopper 1116 and a radially outwardly extending wire takeup element biasing member 1124. Similarly, biasing plate 1056 includes a radially outwardly extending stopper 1108 and a radially outwardly extending wire takeup element biasing member 1128. One end 1092 of spring 1048 is inserted into one of a plurality of circumferential openings 1096 formed in biasing plate 1036, and the other end 1100 of spring 1048 engages stopper 1108 of biasing plate 1056. As a result, biasing plate 1036 is biased in a clockwise direction so that stopper 1116 abuts against a stopper column 1112 that extends upwardly from bias stopper plate 1068, and biasing plate 1056 is biased in a counterclockwise direction so that stopper 1108 abuts against stopper column 1112. Bias engaging member 1120 of wire takeup element 1008 is sandwiched in a first (e.g., home or neutral) transmission control position between wire takeup element biasing members 1124 and 1128. When wire takeup element 1008 rotates in a clockwise direction toward a second (e.g., wire released) transmission control position, then spring 1048 and biasing plate 1056 function as a transmission control element biasing mechanism that biases wire takeup element 1008 counterclockwise back toward the first transmission control position. Similarly, when wire takeup element 1008 rotates in a counterclockwise direction toward a third (e.g., wire pulled) transmission control position, then spring 1048 and biasing plate 1036 function as another transmission control element biasing mechanism that biases wire takeup element 1008 clockwise back toward the first transmission control position.

Gear indicator unit 812 includes a cover 1150 (FIG. 21) with a transparent window 1154, an indicator 1158, a pawi support plate 1162, a motion transmitting member 1166, first/second indicator drive elements such as pawls 1170 and 1174, and a bias spring 1178. Indicator 1158 is rotatably mounted to head 996 of bolt 984 through a screw 1182 and washer 1186. As shown more clearly in FIG. 25(A), indicator 1158 includes first/second indicator driven elements such as pawi teeth 1158*a*, 1158*b*, 1158*c* and 1158*d*. Pawl 1170 with its corresponding pawl teeth 1158*c* and 1158*d*, and pawl 1174 with its corresponding pawl teeth 1158*a* and 1158*b*, each form an indicator coupling unit. Screw 1182 also mounts pawl support plate 1162 to head 996 of bolt 984, and pawi support plate 1162 is nonrotatably fixed to base member 816 by virtue of a ledge 1190 on pawi support plate 1162 that engages a ledge 1194 on base member 816. Pawl support plate 1162 includes a pawl disengaging surface 1162*a* that functions in a manner described below.

Motion transmitting member 1166 is coupled to wire takeup element 1008 by a pair of tabs 1198 that engage openings 1200 formed in wire takeup element 1008 so that motion transmitting member 1166 moves as a unit with wire takeup element 1008. Motion transmitting member 1166 also includes a pawl shaft 1204 for pivotably supporting pawls 1170 and 1174 so that each pawl may move between an indicator driven element engaging position and an indicator driven element disengaging position. An end 1230 of spring 1178 engages pawl 1170 and functions as a biasing mechanism for biasing pawl 1170 toward its corresponding indicator driven element engaging position. Similarly, an end 1234 of spring 1178 engages pawl 1174 and functions as a biasing mechanism for biasing pawl 1174 toward its corresponding indicator driven element engaging position. Pawls 1170 and 1174 and spring 1178 are retained to pawl shaft 1204 through a clip 1208.

Figure 23A:
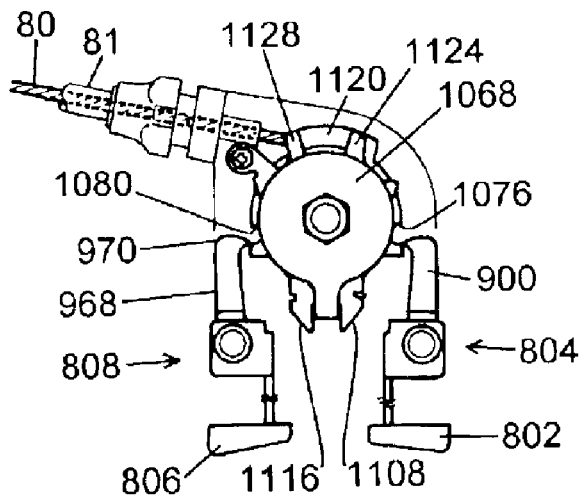
FIGS. 23(A)–23(C) are views illustrating the operation of the shift control device.
Figure 23B:
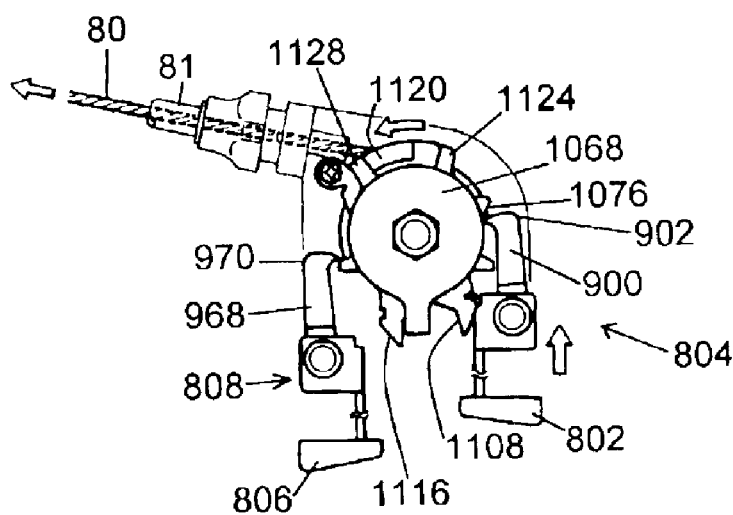
Figure 24A:
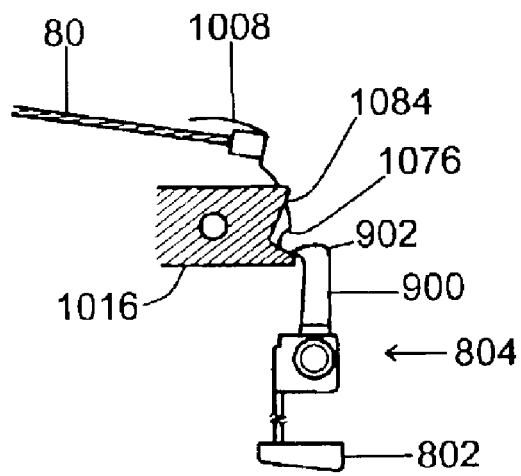
FIGS. 24(A)–24(D) are more detailed views illustrating the operation of the shift control device.
Figure 24B:
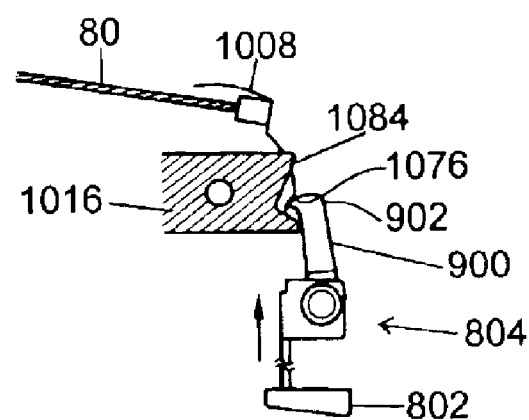
Figure 24C:
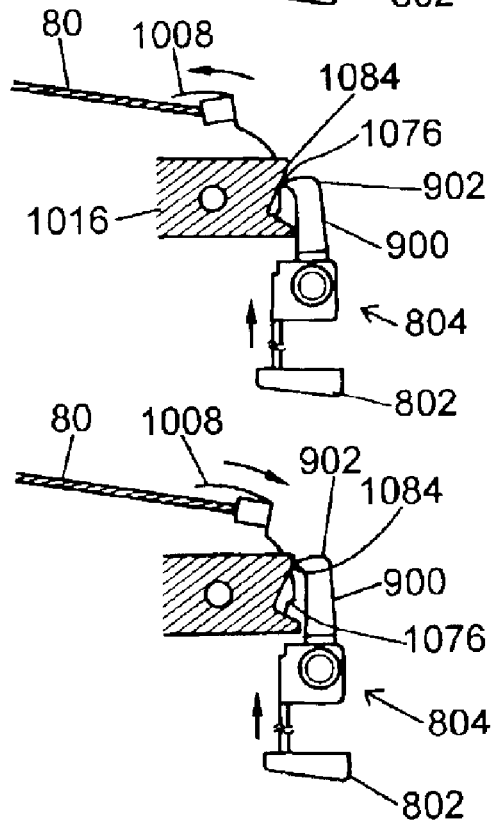
Figure 24D:
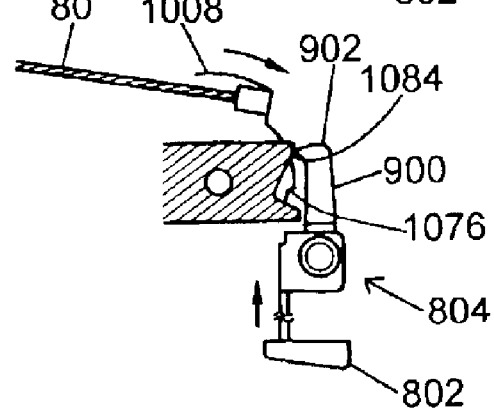

FIGS. 23(A)–23(B) and 24(A)–24(D) illustrate the operation of shift control device 800 (viewed from the bottom and rotated 1800) when actuating member 804 moves from a first shift control position shown in FIGS. 23(A) and 24(A) to a second shift control position shown in FIG. 24(D). When finger contact portion 802 of actuating member 804 is initially pressed, pawl tooth 902 moves along cam surface 1084, and pawl 900 rotates counterclockwise as a result of the biasing force of spring 904 and the shape of cam surface 1084 until pawl tooth 902 engages (e.g., contacts) transmission control abutment 1076 of wire takeup element 1008 as shown in FIG. 24(B). Further pressing of finger contact portion 802 causes wire takeup element 1008 to rotate counterclockwise to release inner wire 80 as shown in FIG. 24(C), and assist mechanism 14 operates as described above. At the same time, bias engaging member 1120 presses against wire takeup element biasing member 1128 of biasing plate 1056 as shown in FIG. 23(B) and rotates biasing plate 1056 counterclockwise against the biasing force of spring 1048. Further pressing of finger contact portion 802 causes pawl 900 to rotate clockwise as a result of the shape of cam surface 1084 until pawl tooth 902 disengages from transmission control abutment 1076 of wire takeup element 1008 as shown in FIG. 24(D). When this occurs, wire takeup element 1008 and biasing plate 1056 rotate counterclockwise back to the position shown in FIGS. 23(A) and 24(A) as a result of the biasing force of spring 1048. The disengagement of pawl tooth 902 from transmission control abutment 1076 also produces a "click" or detent feeling at finger contact member 802, thus informing the rider that finger contact member 802 may be released.

Figure 23C:
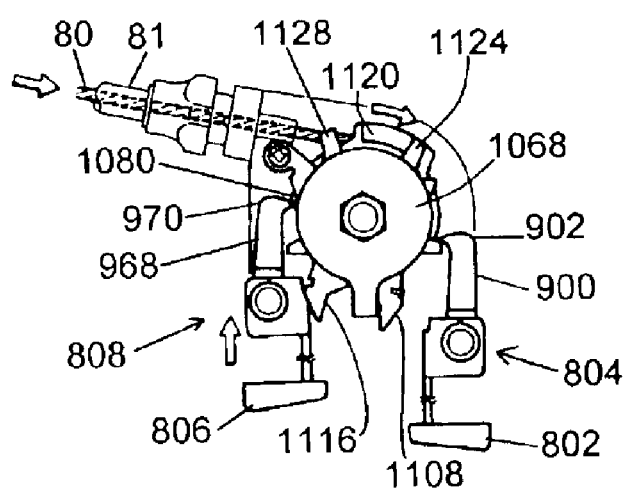

Shift control device 800 operates in a similar way when finger contact member 806 of actuating member 808 is pressed as shown in FIG. 23(C). In this case, pawl tooth 970 engages transmission control abutment 1080 of wire takeup element 1008 to rotate wire takeup element 1008 clockwise in a wire pulling direction, and assist mechanism 14 operates accordingly. At the same time, bias engaging member 1120 presses against wire takeup element biasing member 1124 of biasing plate 1036 as shown in FIG. 23(C) and rotates biasing plate 1036 clockwise against the biasing force of spring 1048. Further pressing of finger contact portion 806 causes pawl 968 to rotate counterclockwise as a result of the shape of cam surface 1088 until pawl tooth 970 disengages from transmission control abutment 1088 of wire takeup element 1008. When this occurs, wire takeup element 1008 and biasing plate 1036 rotate counterclockwise back to the position shown in FIG. 23(A) as a result of the biasing force of spring 1048. The disengagement of pawl tooth 970 from transmission control abutment 1088 produces a similar "click" or detent feeling at finger contact member 806 to inform the rider that finger contact member 806 may be released.

Figure 25A:
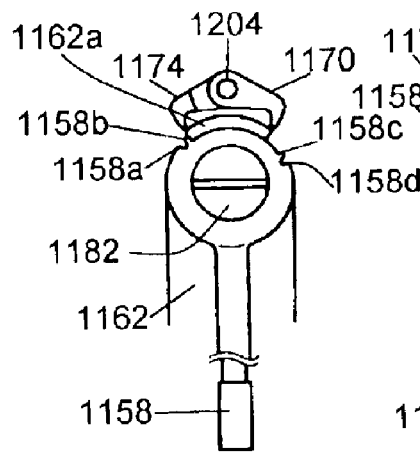
FIGS. 25(A)–25(I) are views illustrating the operation of the gear indicator in a first direction.
Figure 25B:
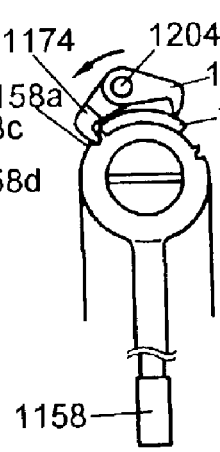
Figure 25C:
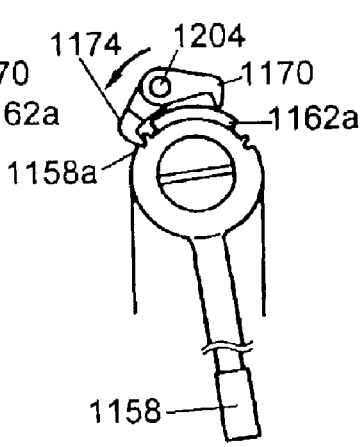
Figure 25D:
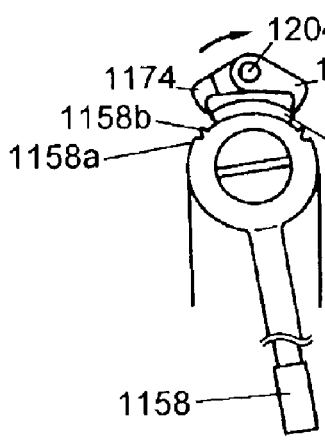

The operation of indicator unit 812 when shift control device 800 is operated in the wire pulling direction (viewed from the top) is shown in FIGS. 25(A)–25(I). FIG. 25(A) shows indicator 1158 in a home position. At this time, wire takeup element 1008 is in the first transmission control position, and pawls 1170 and 1174 are supported by pawl disengaging surface 1162*a*. When wire takeup element 1008 rotates counterclockwise as a result of pressing finger contact surface 806 of actuating member 808, motion transmitting member 1166 moves pawls 1170 and 1174 to the position shown in FIG. 25(B) so that pawl 1174 contacts pawl tooth 1158*a*. Further rotation of wire takeup element 1008 causes pawl 1174 to press against pawl tooth 1158*a* and rotate indicator 1158 to the position shown in FIG. 25(C). When pawl tooth 970 disengages from transmission control abutment 1080 and wire takeup element 1008 rotates clockwise back toward the first transmission control position, motion transmitting member 1166 causes pawl 1174 to disengage from pawl tooth 1158a, and pawls 1170 and 1174 rotate to the position shown in FIG. 25(D), wherein pawls 1170 and 1174 are supported by pawl disengaging surface 1162a. Thus, even though wire takeup element 1008 has rotated back to its original position, indicator 1158 reflects the newly selected gear.

Figure 25E:
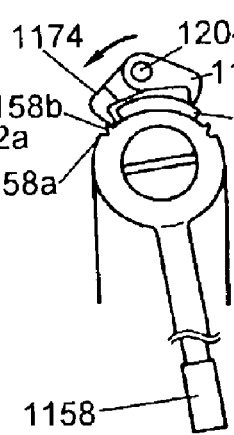
Figure 25F:
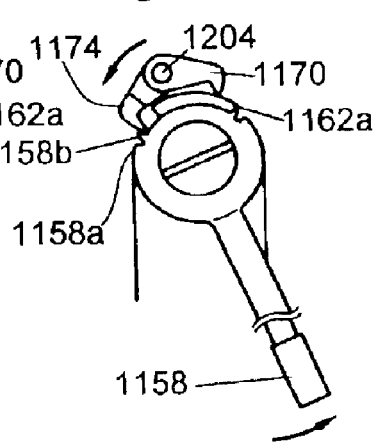
Figure 25G:
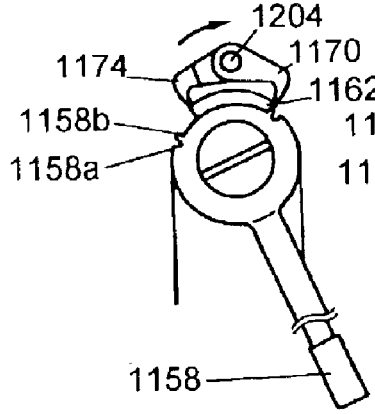
Figure 25H:
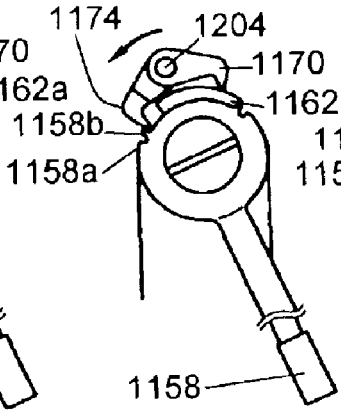
Figure 25I:
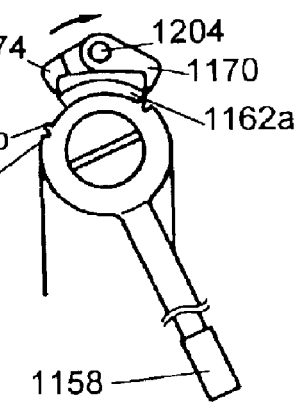

When wire takeup element 1008 rotates counterclockwise as a result of pressing finger contact surface 806 of actuating member 808 a second time, motion transmitting member 1166 moves pawls 1170 and 1174 to the position shown in FIG. 25(E) so that pawl 1174 contacts pawl tooth 1158b. Further rotation of wire takeup element 1008 causes pawl 1174 to press against pawl tooth 1158b and rotate indicator 1158 to the position shown in FIG. 25(F). When pawl tooth 970 disengages from transmission control abutment 1080 and wire takeup element 1008 rotates clockwise back toward the first transmission control position, motion transmitting member 1166 causes pawl 1174 to disengage from pawl tooth 1158b, and pawls 1170 and 1174 rotate back to the position shown in FIG. 25(G), wherein pawls 1170 and 1174 again are supported by pawl supporting member 1162a, and indicator 1158 reflects the final gear in the series.

In this embodiment, assist mechanism 14 accommodates three front gears. If the rider forgets that the derailleur already is at the final gear and presses finger contact member 806 again, then wire takeup element 1008 again rotates counterclockwise, and motion transmitting member 1166 moves pawls 1170 and 1174 to the position shown in FIG. 25(H). This time, however, there is no pawl tooth to engage. As a result, indicator 1158 remains in the same position. Wire takeup element 1008 then rotates back to the first transmission control position, and pawls 1170 and 1174 again are supported on pawl disengaging surface 1162a. Of course, increasing or decreasing the number of pawl teeth can accommodate more or less gears as desired.

Figure 26A:
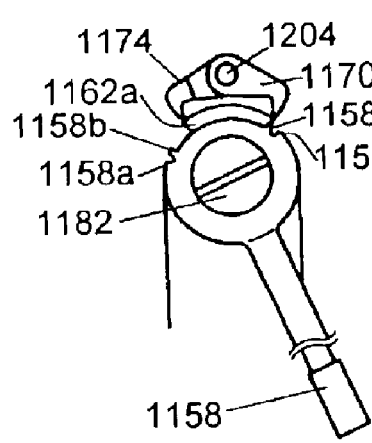
FIGS. 26(A)–26(I) are views illustrating the operation of the gear indicator in an opposite direction.
Figure 26B:
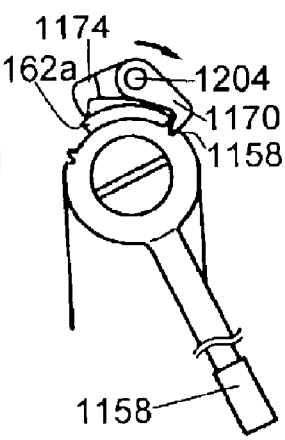
Figure 26C:
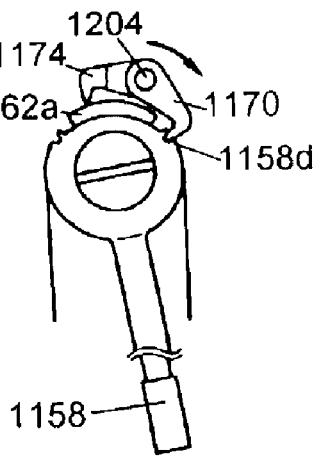
Figure 26D:
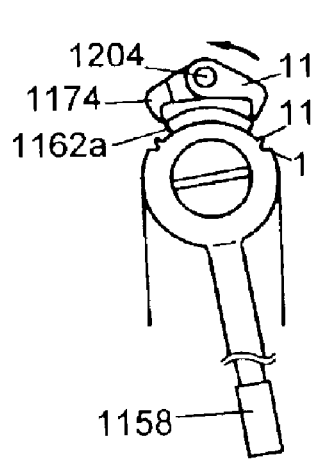

The operation of indicator unit 812 when shift control device 800 is operated in the opposite (wire releasing) direction is shown in FIGS. 26(A)–26(I). FIG. 26(A) shows indicator 1158 in the same position shown in FIG. 25(H). That is, wire takeup element 1008 is in the first transmission control position, and pawls 1170 and 1174 are supported by pawl disengaging surface 1162a. When wire takeup element 1008 rotates clockwise as a result of pressing finger contact surface 802 of actuating member 804, motion transmitting member 1166 moves pawls 1170 and 1174 to the position shown in FIG. 26(B) so that pawl 1170 contacts pawl tooth 1158d. Further rotation of wire takeup element 1008 causes pawl 1170 to press against pawl tooth 1158d and rotate indicator 1158 to the position shown in FIG. 26(C). When pawl tooth 902 disengages from transmission control abutment 1076 and wire takeup element 1008 rotates counterclockwise back toward the first transmission control position, motion transmitting member 1166 causes pawl 1170 to disengage from pawl tooth 1 158d, and pawls 1170 and 1174 rotate back to the position shown in FIG. 26(D), wherein pawls 1170 and 1174 are supported by pawl disengaging surface 1162a.

Figure 26E:
Figure 26F:
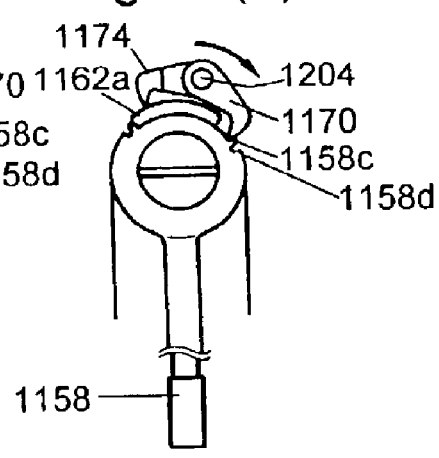
Figure 26G:
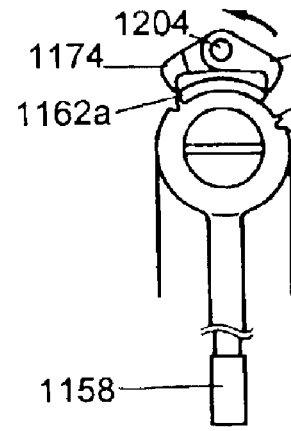

When wire takeup element 1008 rotates clockwise as a result of pressing finger contact surface 802 of actuating member 804 a second time, motion transmitting member 1166 moves pawls 1170 and 1174 to the position shown in FIG. 26(E) so that pawl 1170 contacts pawl tooth 1158c. Further rotation of wire takeup element 1008 causes pawl 1170 to press against pawl tooth 1158c and rotate indicator 1158 to the position shown in FIG. 26(F). When pawl tooth 902 disengages from transmission control abutment 1080 and wire takeup element 1008 rotates counterclockwise back toward the first transmission control position, motion transmitting member 1166 causes pawl 1170 to disengage from pawl tooth 1158c, and pawls 1170 and 1174 rotate to the position shown in FIG. 26(G), wherein pawls 1170 and 1174 again are supported by pawl disengaging surface 1162a, and indicator 1158 is back in its original position.

Figure 26H:
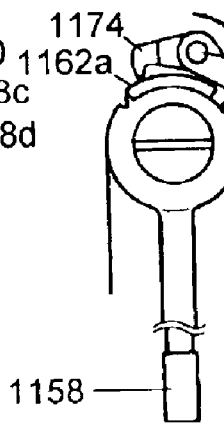
Figure 26I:
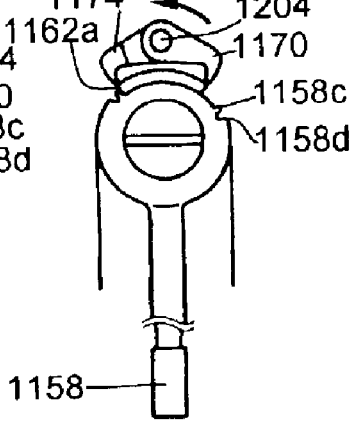

Once again, if the rider forgets that the derailleur already is at the final gear position and presses finger contact member 802 again, then wire takeup element 1008 again rotates clockwise, and motion transmitting member 1166 moves pawls 1170 and 1174 to the position shown in FIG. 26(H). Since there is no pawl tooth to engage, indicator 1158 remains in the same position, wire takeup element 1008 rotates back to the first transmission control position, and pawls 1170 and 1174 again are supported on pawl disengaging surface 1162a.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A shift control device comprising:
   a mounting unit;
   a transmission control element movably mounted to the mounting unit, wherein the transmission control element moves between a first transmission control position and a second transmission control position;
   a first transmission control element biasing mechanism for biasing the transmission control element toward the first transmission control position;
   a first shift control element that moves between a first shift control position and a second shift control position;
   wherein the first shift control element and the transmission control element are operatively coupled such that the transmission control element moves toward the second transmission control position when the first shift control element moves toward the second shift control position, and wherein the transmission control element moves toward the first transmission control position as the first shift control element continues to move toward the second shift control position.

2. The device according to claim 1 wherein the first shift control element comprises a manually operated first actuating member.

3. The device according to claim 2 wherein the actuating member comprises:
   an elongated portion; and
   a finger contact portion coupled to the elongated portion.

4. The device according to claim 1 wherein the first shift control element comprises a first shift control drive member, wherein the transmission control element comprises a first transmission control driven member, and wherein the first shift control drive member drives the first transmission control driven member to move the transmission control element toward the second transmission control position.

5. The device according to claim 4 wherein the first shift control drive member engages the first transmission control driven member to drive the first transmission control driven member, and further comprising a first release member that disengages the first shift control drive member from the transmission control driven member as the first shift control element moves toward the second shift control position.

6. The device according to claim 5 wherein the first shift control drive member comprises a first shift control abutment, wherein the first transmission control driven member comprises a first transmission control abutment, and wherein the first shift control abutment contacts the first transmission control abutment when the first shift control element moves the transmission control element toward the second transmission control position.

7. The device according to claim 6 wherein the first release member comprises a first cam surface that moves the first shift control abutment away from the first transmission control abutment.

8. The device according to claim 5 wherein the first shift control element comprises a manually operated first actuating member.

9. The device according to claim 8 wherein the first shift control drive member is movably supported relative to the first actuating member.

10. The device according to claim 9 further comprising a first drive member biasing mechanism for biasing the first shift control drive member toward the transmission control element.

11. The device according to claim 1 further comprising:
a second shift control element that moves between a third shift control position and a fourth shift control position; and
wherein the second shift control element and the transmission control element are operatively coupled such that the transmission control element moves toward a third transmission control position when the second shift control element moves toward the fourth shift control position, and wherein the transmission control element moves toward the first transmission control position as the second shift control element continues to move toward the fourth shift control position.

12. The device according to claim 11 wherein the transmission control element moves in a first direction from the first transmission control position to the second transmission control position, wherein the transmission control element moves in a second direction from the first transmission control position to the third transmission control position, and wherein the first direction is different from the second direction.

13. The device according to claim 12 wherein the transmission control element is rotatably supported relative to the mounting unit.

14. The device according to claim 13 wherein the first direction is opposite the second direction.

15. The device according to claim 14 wherein the transmission control element includes a wire winding groove.

16. The device according to claim 12 further comprising a second transmission control element biasing mechanism for biasing the transmission control element toward the first transmission control position.

17. The device according to claim 16 wherein the first transmission control element biasing mechanism biases the transmission control element in a first biasing direction, wherein the second transmission control element biasing mechanism biases the transmission control element in a second biasing direction, and wherein the first biasing direction is opposite the second biasing direction.

18. The device according to claim 17 wherein the first shift control element comprises a first shift control drive member, wherein the transmission control element comprises a first transmission control driven member, wherein the first shift control drive member drives the first transmission control driven member to move the transmission control element in a first drive direction toward the second transmission control position, wherein the second shift control element comprises a second shift control drive member, wherein the transmission control element comprises a second transmission control driven member, wherein the second shift control drive member drives the second transmission control driven member to move the transmission control element in a second drive direction toward the third transmission control position, and wherein the first drive direction is different from the second drive direction.

19. The device according to claim 18 wherein the first shift control drive member engages the first transmission control driven member to drive the first transmission control driven member, wherein the second shift control drive member engages the second transmission control driven member to drive the second transmission control driven member, and further comprising:
a first release member that disengages the first shift control drive member from the transmission control driven member as the first shift control element moves toward the second shift control position; and
a second release member that disengages the second shift control drive member from the transmission control driven member as the second shift control element moves toward the fourth shift control position.

20. The device according to claim 19 wherein the first shift control drive member comprises a first shift control abutment, wherein the first transmission control driven member comprises a first transmission control abutment, wherein the second shift control drive member comprises a second shift control abutment, wherein the second transmission control driven member comprises a second transmission control abutment, wherein the first shift control abutment contacts the first transmission control abutment when the first shift control element moves the transmission control element toward the second transmission control position, and wherein the second shift control abutment contacts the second transmission control abutment when the second shift control element moves the transmission control element toward the third transmission control position.

21. The device according to claim 20 wherein the first release member comprises a first cam surface that moves the first shift control abutment away from the first transmission control abutment, and wherein the second release member comprises a second cam surface that moves the second shift control abutment away from the second transmission control abutment.

22. The device according to claim 19 wherein the first shift control element comprises a manually operated first actuating member, and wherein the second shift control element comprises a manually operated second actuating member.

23. The device according to claim 22 wherein the first shift control drive member is movably supported relative to the first actuating member, and wherein the second shift control drive member is movably supported relative to the second actuating member.

24. The device according to claim 23 further comprising;
a first drive member biasing mechanism for biasing the first shift control drive member toward the transmission control element; and a second drive member biasing mechanism for biasing the second shift control drive member toward the transmission control element.

25. The device according to claim 24 wherein the transmission control element is rotatably supported relative to the mounting unit.

26. The device according to claim 25 wherein the transmission control element includes a wire winding groove.

27. The device according to claim 1 further comprising:
an indicator that moves between a first indicator position and a second indicator position; and
an indicator coupling unit that moves the indicator from the first indicator position to the second indicator position when the transmission control element moves toward the second transmission control position without moving the indicator back to the first indicator position when the transmission control element moves back toward the first transmission control position.

28. The apparatus according to claim 27 wherein the indicator coupling unit comprises:
a first indicator drive element that moves with the transmission control element;
a first indicator driven element that moves with the indicator; and
wherein the first indicator drive element engages the first indicator driven element when the transmission control element moves toward the second transmission control position.

29. The apparatus according to claim 28 wherein the first indicator drive element disengages from the first indicator driven element when the transmission control element moves toward the first transmission control position.

30. The apparatus according to claim 29 wherein the first indicator drive element moves between a first indicator driven element engaging position and a first indicator driven element disengaging position, and further comprising a first biasing mechanism for biasing the first indicator drive element toward the first indicator driven element engaging position.

31. The apparatus according to claim 29 wherein the indicator coupling unit further comprises a motion transmitting member coupled to the transmission control element, and wherein the first indicator drive element comprises a first pawl pivotably coupled to the motion transmitting member.

32. The apparatus according to claim 31 wherein the first pawl moves between a first indicator driven element engaging position and a first indicator driven element disengaging position, and further comprising a first biasing mechanism for biasing the first pawl toward the first indicator driven element engaging position.

33. The apparatus according to claim 32 wherein the first indicator driven element comprises a first pawl tooth disposed on the indicator.

34. The apparatus according to claim 33 further comprising a pawl support that maintains the first pawl in the first indicator driven element disengaging position when the transmission control element is in the first transmission control position.

35. The apparatus according to claim 28 wherein the transmission control element moves in a first transmission control direction from the first transmission control position toward the second transmission control position, wherein the transmission control element moves in a second transmission control direction from the first transmission control position toward a third transmission control position, and wherein the first transmission control direction is different from the second transmission control direction.

36. The apparatus according to claim 35 wherein the transmission control element is rotatably supported relative to the mounting member.

37. The apparatus according to claim 35 wherein the first transmission control direction is opposite the second transmission control direction.

38. The apparatus according to claim 35 wherein the transmission control element includes a wire winding groove.

39. The apparatus according to claim 35 wherein the indicator moves in a first indicator direction from the first indicator position to the second indicator position, wherein the indicator moves in a second indicator direction from the first indicator position to a third indicator position, and wherein the first indicator direction is different from the second indicator direction.

40. The apparatus according to claim 39 wherein the indicator coupling unit further comprises:
a second indicator drive element that moves with the transmission control element;
a second indicator driven element that moves with the indicator; and
wherein the second indicator drive element engages the second indicator driven element when the transmission control element moves toward the third transmission control position for moving the indicator to the third indicator position.

41. The apparatus according to claim 40 wherein the first indicator drive element disengages from the first indicator driven element when the transmission control element moves back toward the first transmission control position, and wherein the second indicator drive element disengages from the second indicator driven element when the transmission control element moves back toward the first transmission control position.

42. The apparatus according to claim 41 wherein the first indicator drive element moves between a first indicator driven element engaging position and a first indicator driven element disengaging position, wherein the second indicator drive element moves between a second indicator driven element engaging position and a second indicator driven element disengaging position, and further comprising:
a first biasing mechanism for biasing the first indicator drive element toward the first indicator driven element engaging position; and
a second biasing mechanism for biasing the second indicator drive element toward the second indicator driven element engaging position.

43. The apparatus according to claim 41 wherein the indicator coupling unit further comprises a motion transmitting member coupled to the transmission control element, wherein the first indicator drive element comprises a first pawl pivotably coupled to the motion transmitting member, and wherein the second indicator drive element comprises a second pawl pivotably coupled to the motion transmitting member.

44. The apparatus according to claim 43 wherein the first pawl moves between a first indicator driven element engaging position and a first indicator driven element disengaging position, wherein the second pawl moves between a second indicator driven element engaging position and a second indicator driven element disengaging position, and further comprising:
a first biasing mechanism for biasing the first pawl toward the first indicator driven element engaging position; and a second biasing mechanism for biasing the second pawl toward the second indicator driven element engaging position.

45. The apparatus according to claim 44 wherein the first indicator driven element comprises a first pawl tooth disposed on the indicator, and wherein the second indicator driven element comprises a second pawl tooth disposed on the indicator.

46. The apparatus according to claim 45 further comprising a pawl support that maintains the first pawl in the first indicator driven element disengaging position when the transmission control element is in the first transmission control position and that maintains the second pawl in the second indicator driven element disengaging position when the transmission control element is in the first transmission control position.

47. The apparatus according to claim 46 wherein the transmission control element is rotatably supported relative to the mounting member.

48. The apparatus according to claim 47 wherein the first transmission control direction is opposite the second transmission control direction, wherein the first indicator direction is the same as the first transmission control direction, and wherein the second indicator direction is the same as the second transmission control direction.

49. The apparatus according to claim 48 wherein the transmission control element includes a wire winding groove.

50. A shift control device comprising:
 a mounting unit;
 a transmission control element movably mounted to the mounting unit, wherein the transmission control element includes a first transmission control driven member that moves between a first transmission control position and a second transmission control position;
 a first transmission control element biasing mechanism for biasing the transmission control element toward the first transmission control position;
 a first shift control element including a first shift control drive member that moves between a first shift control position and a second shift control position;
 wherein the first shift control drive member engages the first transmission control driven member to move the transmission control element toward the second transmission control position when the first shift control element moves toward the second shift control position; and
 wherein the first shift control drive member disengages from the transmission control driven member as the first shift control element moves toward the second shift control position so that the transmission control element moves back toward the first transmission control position.

51. An indicator apparatus for a shift control device comprising:
 a mounting unit;
 a transmission control element movably mounted relative to the mounting unit, wherein the transmission control element moves between a first transmission control position and a second transmission control position;
 an indicator that moves between a first indicator position and a second indicator position; and
 an indicator coupling unit that moves the indicator from the first indicator position to the second indicator position when the transmission control element moves toward the second transmission control position without moving the indicator back to the first indicator position when the transmission control element moves back toward the first transmission control position.

52. The apparatus according to claim 51 wherein the indicator coupling unit comprises:
 a first indicator drive element that moves with the transmission control element;
 a first indicator driven element that moves with the indicator; and
 wherein the first indicator drive element engages the first indicator driven element when the transmission control element moves toward the second transmission control position.

53. The apparatus according to claim 52 wherein the first indicator drive element disengages from the first indicator driven element when the transmission control element moves toward the first transmission control position.

54. The apparatus according to claim 53 wherein the first indicator drive element moves between a first indicator driven element engaging position and a first indicator driven element disengaging position, and further comprising a first biasing mechanism for biasing the first indicator drive element toward the first indicator driven element engaging position.

55. The apparatus according to claim 53 wherein the indicator coupling unit further comprises a motion transmitting member coupled to the transmission control element, and wherein the first indicator drive element comprises a first pawl pivotably coupled to the motion transmitting member.

56. The apparatus according to claim 55 wherein the first pawl moves between a first indicator driven element engaging position and a first indicator driven element disengaging position, and further comprising a first biasing mechanism for biasing the first pawl toward the first indicator driven element engaging position.

57. The apparatus according to claim 56 wherein the first indicator driven element comprises a first pawl tooth disposed on the indicator.

58. The apparatus according to claim 57 further comprising a pawl support that maintains the first pawl in the first indicator driven element disengaging position when the transmission control element is in the first transmission control position.

59. The apparatus according to claim 52 wherein the transmission control element moves in a first transmission control direction from the first transmission control position toward the second transmission control position, wherein the transmission control element moves in a second transmission control direction from the first transmission control position toward a third transmission control position, and wherein the first transmission control direction is different from the second transmission control direction.

60. The apparatus according to claim 59 wherein the transmission control element is rotatably supported relative to the mounting member.

61. The apparatus according to claim 59 wherein the first transmission control direction is opposite the second transmission control direction.

62. The apparatus according to claim 59 wherein the transmission control element includes a wire winding groove.

63. The apparatus according to claim 59 wherein the indicator moves in a first indicator direction from the first indicator position to the second indicator position, wherein the indicator moves in a second indicator direction from the first indicator position to a third indicator position, and wherein the first indicator direction is different from the second indicator direction.

64. The apparatus according to claim 63 wherein the indicator coupling unit further comprises:
 a second indicator drive element that moves with the transmission control element;
 a second indicator driven element that moves with the indicator; and
 wherein the second indicator drive element engages the second indicator driven element when the transmission control element moves toward the third transmission control position for moving the indicator to the third indicator position.

65. The apparatus according to claim 64 wherein the first indicator drive element disengages from the first indicator driven element when the transmission control element moves back toward the first transmission control position, and wherein the second indicator drive element disengages from the second indicator driven element when the transmission control element moves back toward the first transmission control position.

66. The apparatus according to claim 65 wherein the first indicator drive element moves between a first indicator driven element engaging position and a first indicator driven element disengaging position, wherein the second indicator drive element moves between a second indicator driven element engaging position and a second indicator driven element disengaging position, and further comprising:
 a first biasing mechanism for biasing the first indicator drive element toward the first indicator driven element engaging position; and
 a second biasing mechanism for biasing the second indicator drive element toward the second indicator driven element engaging position.

67. The apparatus according to claim 65 wherein the indicator coupling unit further comprises a motion transmitting member coupled to the transmission control element, wherein the first indicator drive element comprises a first pawl pivotably coupled to the motion transmitting member, and wherein the second indicator drive element comprises a second pawl pivotably coupled to the motion transmitting member.

68. The apparatus according to claim 67 wherein the first pawl moves between a first indicator driven element engaging position and a first indicator driven element disengaging position, wherein the second pawl moves between a second indicator driven element engaging position and a second indicator driven element disengaging position, and further comprising:
 a first biasing mechanism for biasing the first pawl toward the first indicator driven element engaging position; and
 a second biasing mechanism for biasing the second pawl toward the second indicator driven element engaging position.

69. The apparatus according to claim 68 wherein the first indicator driven element comprises a first pawl tooth disposed on the indicator, and wherein the second indicator driven element comprises a second pawl tooth disposed on the indicator.

70. The apparatus according to claim 69 further comprising a pawl support that maintains the first pawl in the first indicator driven element disengaging position when the transmission control element is in the first transmission control position and that maintains the second pawl in the second indicator driven element disengaging position when the transmission control element is in the first transmission control position.

71. The apparatus according to claim 70 wherein the transmission control element is rotatably supported relative to the mounting member.

72. The apparatus according to claim 71 wherein the first transmission control direction is opposite the second transmission control direction, wherein the first indicator direction is the same as the first transmission control direction, and wherein the second indicator direction is the same as the second transmission control direction.

73. The apparatus according to claim 72 wherein the transmission control element includes a wire winding groove.

* * * * *